(12) United States Patent
Bishop

(10) Patent No.: US 7,451,605 B2
(45) Date of Patent: *Nov. 18, 2008

(54) LNG RECEIVING TERMINAL THAT PRIMARILY USES COMPENSATED SALT CAVERN STORAGE AND METHOD OF USE

(75) Inventor: William M. Bishop, Katy, TX (US)

(73) Assignee: Conversion Gas Imports, L.P., Houston, TX (US)

(*) Notice: Subject to any disclaimer, the term of this patent is extended or adjusted under 35 U.S.C. 154(b) by 379 days.

This patent is subject to a terminal disclaimer.

(21) Appl. No.: 11/307,806

(22) Filed: Feb. 23, 2006

(65) Prior Publication Data

US 2006/0150640 A1 Jul. 13, 2006

Related U.S. Application Data

(63) Continuation-in-part of application No. 10/907,330, filed on Mar. 29, 2005, now Pat. No. 7,036,325, which is a continuation of application No. 10/709,153, filed on Apr. 16, 2004, now Pat. No. 6,945,055, which is a continuation of application No. 10/384,156, filed on Mar. 7, 2003, now Pat. No. 6,813,893, which is a continuation-in-part of application No. 10/246,954, filed on Sep. 18, 2002, now Pat. No. 6,739,140.

(60) Provisional application No. 60/342,157, filed on Dec. 19, 2001.

(51) Int. Cl.
   *F17C 1/00* (2006.01)

(52) U.S. Cl. ...................................... 62/53.1

(58) Field of Classification Search ................ 62/53.1, 62/45.1, 54.1
See application file for complete search history.

(56) References Cited

U.S. PATENT DOCUMENTS 2,871,668 A 2/1959 Reed
3,232,725 A * 2/1966 Secord et al. ................ 48/190

(Continued)

FOREIGN PATENT DOCUMENTS

EP 0525287 A1 3/1993

OTHER PUBLICATIONS

American Gas Association: LNG Information Book; 1981; pp. 61-72, Catalog No. X00981; American Gas Association, Arlington, VA U.S.A.

*Primary Examiner*—William C Doerrler
(74) *Attorney, Agent, or Firm*—Husch Blackwell Sanders LLP

(57) ABSTRACT

In the past, "compensated" salt caverns have operated with a compensating liquid, such as brine to displace a stored liquid, such as crude oil, when the stored liquid is needed on the surface. Virtually all of the stored liquid in a compensated salt cavern can be expelled from the salt cavern when it is filled with the compensating liquid. In the past, "uncompensated" salt caverns have been used to store gases, such as natural gas. Uncompensated caverns operate without any compensating liquid; instead they rely on pressure. Some of the stored gas (cushion gas) must always be left in an uncompensated salt cavern. This invention breaks with convention and uses a compensating liquid in a salt cavern to store gases which is a technique believed to be previously unknown. "Cushion gas" is not required because the compensating liquid displaces virtually all of the gas in the salt cavern.

22 Claims, 10 Drawing Sheets

U.S. PATENT DOCUMENTS

| | | | | |
|---|---|---|---|---|
| 3,552,128 | A | 1/1971 | Shook | |
| 3,724,229 | A | 4/1973 | Seliber | |
| 3,777,502 | A | 12/1973 | Michie, III et al. | |
| 3,807,181 | A * | 4/1974 | Kuhne | 405/59 |
| 3,848,427 | A * | 11/1974 | Loofbourow | 62/260 |
| 3,950,958 | A * | 4/1976 | Loofbourow | 62/53.1 |
| 4,858,640 | A | 8/1989 | Kaufmann | |
| 4,894,928 | A | 1/1990 | Bishop | |
| 5,052,856 | A | 10/1991 | Tek | |
| 5,129,759 | A | 7/1992 | Bishop | |
| 5,439,317 | A | 8/1995 | Bishop et al. | |
| 5,511,905 | A * | 4/1996 | Bishop et al. | 405/59 |
| 5,669,734 | A | 9/1997 | Becnel, Jr. et al. | |
| 6,298,671 | B1 | 10/2001 | Kennelley et al. | |
| 6,374,844 | B1 | 4/2002 | Hall | |
| 6,517,286 | B1 | 2/2003 | Latchem | |
| 6,581,618 | B2 | 6/2003 | Hill et al. | |
| 6,584,781 | B2 | 7/2003 | Bishop et al. | |
| 6,739,140 | B2 | 5/2004 | Bishop et al. | |
| 6,813,893 | B2 * | 11/2004 | Bishop et al. | 62/53.1 |
| 6,820,696 | B2 | 11/2004 | Bergman et al. | |
| 6,848,502 | B2 | 2/2005 | Bishop et al. | |
| 6,880,348 | B2 * | 4/2005 | Bishop et al. | 62/53.1 |
| 6,945,055 | B2 * | 9/2005 | Bishop et al. | 62/53.1 |
| 2004/0059692 | A1 | 3/2004 | Hill et al. | |
| 2004/0194476 | A1 | 10/2004 | Bishop et al. | |

* cited by examiner

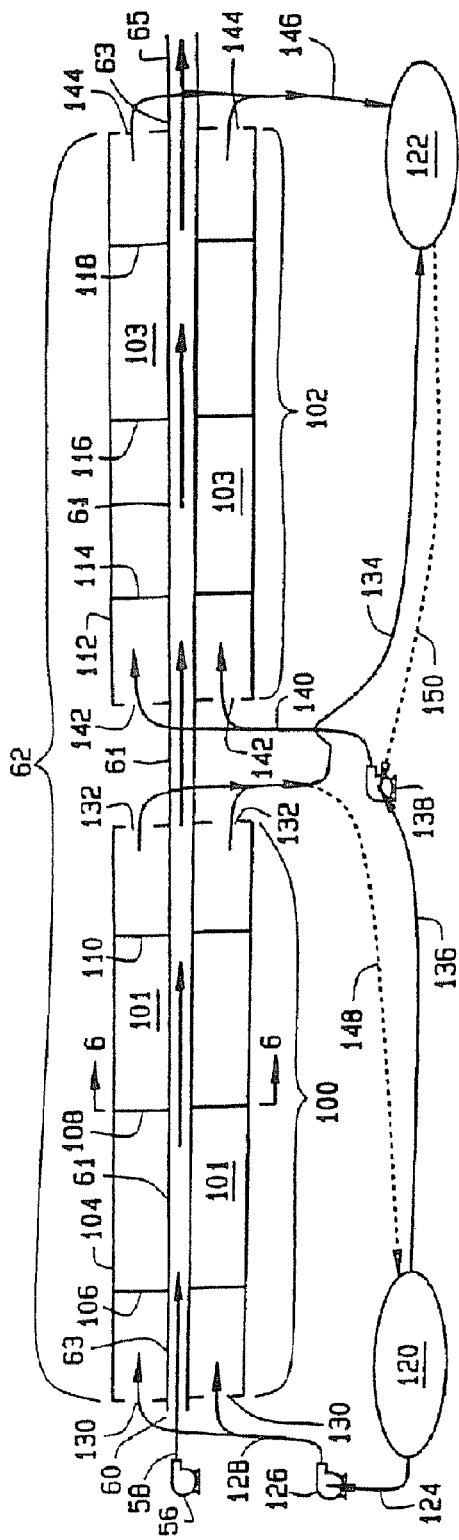
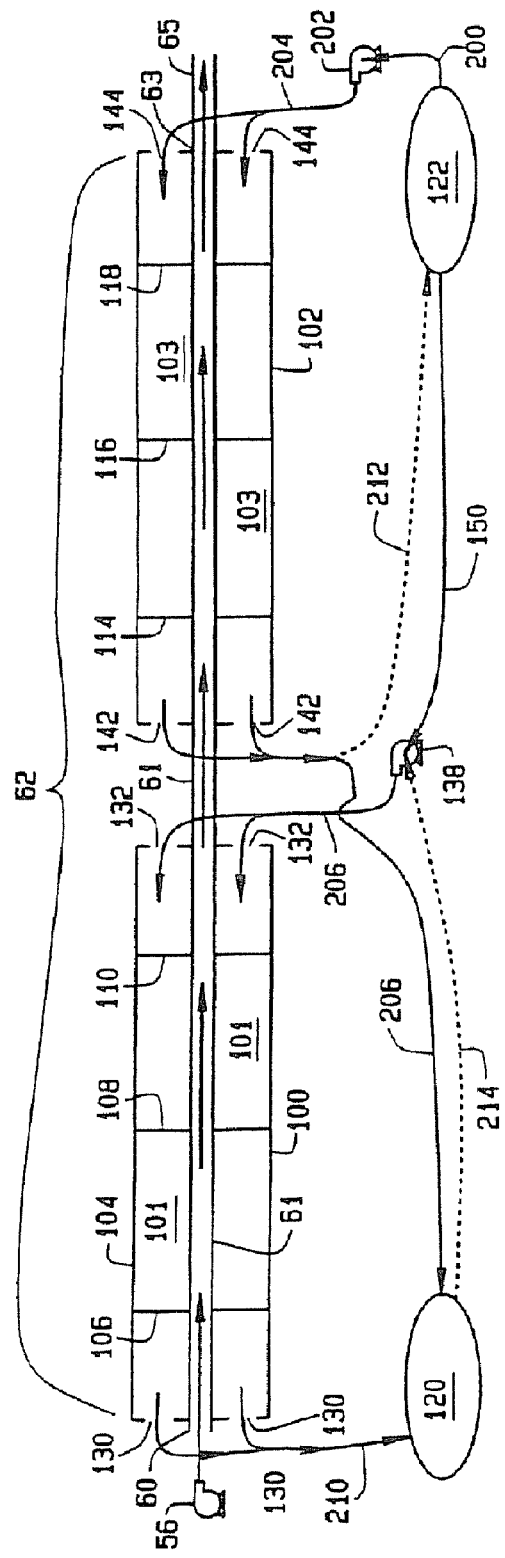
FIG. 2
FIG. 3

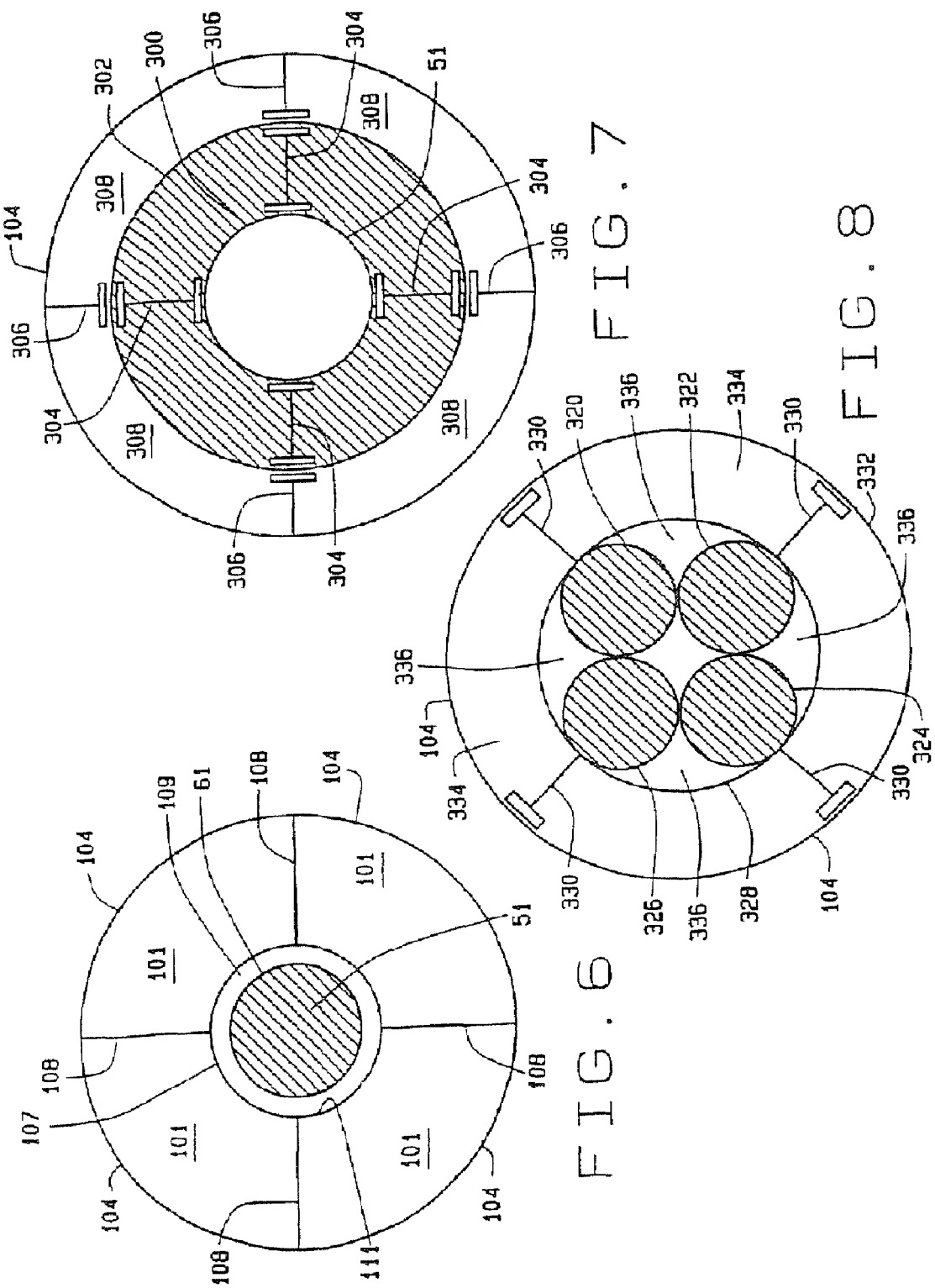

LNG RECEIVING TERMINAL THAT PRIMARILY USES COMPENSATED SALT CAVERN STORAGE AND METHOD OF USE

CROSS REFERENCE TO RELATED APPLICATIONS

This application is a continuation-in-part of U.S. application Ser. No. 10/907,330 filed on Mar. 29, 2005, said application being a continuation of U.S. application Ser. No. 10/709,153 filed on Apr. 16, 2004 and issued on Sep. 20, 2005 as U.S. Pat. No. 6,945,055; said application being a continuation of U.S. application Ser. No. 10/384,156 filed on Mar. 7, 2003 and issued on Nov. 9, 2004 as U.S. Pat. No. 6,813,893; which is a continuation-in-part of application Ser. No. 10/246,954 filed on Sep. 18, 2002 and issued on May 25, 2004 as U.S. Pat. No. 6,739,140; which claims priority of U.S. provisional patent application 60/342,157 filed Dec. 19, 2001.

BACKGROUND OF THE INVENTION

Much of the natural gas used in the United States is produced along the Gulf Coast. There is an extensive pipeline network both offshore and onshore that transports this natural gas from the wellhead to market. In other parts of the world, there is also natural gas production, but sometimes there is no pipeline network to transport the gas to market. In the industry, this sort of natural gas is often referred to as "stranded" because there is no ready market or pipeline connection. As a result, this stranded gas that is produced concurrently with crude oil is often burned at a flare. This is sometimes referred to as being "flared off."

Different business concepts have been developed to more effectively utilize stranded gas. One such concept is construction of a petrochemical plant near the source of natural gas to use the gas as a feedstock for the plant. Several ammonia and urea plants have been constructed around the world for this purpose.

Another approach is to liquefy the natural gas at or near the source and to transport the LNG via ship to a receiving terminal. At the LNG receiving facility, the LNG is offloaded from the transport ship and stored in cryogenic tanks located onshore. At some point, the LNG is transferred from the cryogenic storage tanks to a conventional vaporizer system and gasified. The gas is then sent to market via a pipeline. At the start of this process, liquefaction may consume 9-10% of the LNG by volume. At the end of the process, the gasification may consume an additional 2-3% of the LNG by volume. To the best of Applicants knowledge, none of the existing conventional LNG facilities that use vaporizer systems thereafter store the resulting gas in salt caverns. Rather, the conventional LNG facilities with vaporizers transfer all of the resulting gas to a pipeline for transmission to market.

Currently there are more than 100 LNG transport ships in service worldwide and more are on order. LNG transport ships are specifically designed to transport the LNG as a cryogenic liquid at or below −250° F. and near or slightly above atmospheric pressure. Further, the ships run on the LNG and are counter-flooded to maintain a constant draft of about 40 feet. The LNG ships currently in service vary in size and capacity, but some hold about 3 billion cubic feet of gas (Bcf) (approx. 840,000 barrels) or more. Some of the ships of the future may have even greater capacity and as much as 5 Bcf. One of the reasons LNG is transported as a liquid is because it takes less space.

There are a number of LNG facilities around the world. In the U.S., five LNG receiving facilities are currently operational as follows: Everett, Mass.; south of Lake Charles, La.; Cove Point, Maryland Elba Island, Ga. and the Excelerate terminal located offshore Louisiana. Construction of additional LNG facilities in the U.S. has been announced by several different concerns.

The LNG receiving facilities in the U.S. typically include offloading pumps and equipment, cryogenic storage tanks and a conventional vaporizer system to convert the LNG into a gas. The gas may be odorized using conventional equipment before it is transmitted to market via a pipeline. LNG terminals are typically designed for peak shaving or as a base load facility. Base load LNG vaporization is the term applied to a system that requires almost constant vaporization of LNG for the basic load rather than periodic vaporization for seasonal or peak incremental requirements for a natural gas distribution system. At a typical base load LNG facility, a LNG ship will arrive every 3-5 days to offload the LNG. The LNG is pumped from the ship to the LNG storage tank(s) as a liquid (approx. −250° F.) and stored as a liquid at low-pressure (about one atmosphere). It typically may take 12 hours or more to pump the LNG from the ship to the cryogenic storage tanks onshore.

LNG transport ships may cost more than $100,000,000 to build. It is therefore expedient to offload the LNG as quickly as possible so the ship can return to sea and pick up another load. A typical U.S. LNG base load facility will have three or four cryogenic storage tanks with capacities that vary, but are in the range of 250,000-400,000 barrels each. Many of the current LNG ships have a capacity of approximately 840,000 barrels. It therefore will take several cryogenic tanks to hold the entire cargo from one LNG ship. These tanks are not available to receive LNG from another ship until they are again mostly emptied.

Conventional base load LNG terminals are continuously vaporizing the LNG from the cryogenic tanks and pumping it into a pipeline for transport to market. So, during the interval between ships (3-5 days), the facility converts the LNG to gas (referred to as regasification, gasification or vaporization) which empties the cryogenic tanks to make room for the next shipment. The LNG receiving and gasification terminal may produce in excess of a billion cubic feet of gas per day (BCFD). In summary, transport ships may arrive every few days, but vaporization of the LNG at a base load facility is generally continuous. Conventional vaporizer systems, well known to those skilled in the art, are used to warm and convert the LNG to usable gas. The LNG is warmed from approximately −250° F. in the vaporizer system and converted from liquid phase to usable gas before it can be transferred to a pipeline. Unfortunately, some of the gas is used as a heat source in the vaporization process, or if ambient temperature fluids are used, very large heat exchangers are required. There is a need for a more economical way to convert the LNG from a cold liquid to usable gas.

There are at least three ways to store hydrocarbons underground as follows: 1) storage in depleted or partially depleted gas fields; 2) storage in compensated salt caverns and 3) storage in uncompensated salt caverns.

1. Storage in Depleted or Partially Depleted Gas Fields.

U.S. Pat. No. 6,298,671 is owned by BP Amoco Corporation and is for a Method for Producing, Transporting, Offloading, Storing and Distributing Natural Gas to a Marketplace. The patent teaches production of natural gas from a first remotely located subterranean formation, which is a natural gas producing field. The natural gas is liquefied and shipped to another location. The LNG is re-gasified and injected into a second subterranean formation capable of storing natural gas which is a depleted or at least a partially depleted subterranean formation which has previously produced gas in sufficient quantities to justify the construction of a system of producing wells, gathering facilities and distribution pipelines for the distribution to a market of natural gas from the subterranean formation. The patent teaches injection of the re-gasified natural gas into the depleted or partially depleted natural gas field at temperatures above the hydrate formation level from 32° F. to about 80° F. and at pressures of from about 200 to about 2500 psig. Currently there is over 3 trillion cubic feet (TCF) of subsurface natural gas storage capacity in the U.S., the overwhelming majority of which is in depleted reservoirs.

The '671 Patent makes no mention of a salt cavern. This patent makes no mention of dense phase or the importance thereof. Furthermore, there are limitations on the injection and send out capacity of depleted and partially depleted gas reservoirs that are not present in salt cavern storage. In addition, temperature variances between the depleted reservoir and the injected gas create problems in the depleted reservoir itself that are not present in salt cavern storage. For all of these many reasons, salt caverns are preferred over depleted gas reservoirs for use in a modern LNG facility.

2. Storage in Compensated Salt Caverns.

There are many different types of salt formations around the world. Some, but not all of these salt formations are suitable for cavern storage of hydrocarbons. For example, "domal" type salt is usually suitable for cavern storage. In the U.S., there are more than 300 known salt domes, many of which are located in offshore territorial waters. Salt domes are also known to exist in other areas of the world including Mexico, Northeast Brazil and Europe. Salt domes are solid formations of salt that may have a core temperature of 90° F. or more. A well can be drilled into the salt dome and fresh water can be injected through the well into the salt to create a cavern. Salt cavern storage of hydrocarbons is a proven technique that is well established in the oil and gas industry. Salt caverns are capable of storing large quantities of fluid. Salt caverns have high sendout capacity and most important, they are very, very secure. For example, the U.S. Strategic Petroleum Reserve now stores approximately 600,000,000 barrels of crude oil in salt caverns in Louisiana and Texas, i.e., at Bryan Mound, Tex.

When fresh water is injected into domal salt, it dissolves thus creating brine, which is returned to the surface. The more fresh water that is injected into the salt dome, the larger the cavern becomes. The tops of many salt domes are often found at depths of less than 1500 feet. A salt cavern is an elongate chamber that may be up to 1,500 feet in length and have a capacity that varies between 3-15,000,000 barrels. The largest is about 40 million barrels. Each cavern itself needs to be fully surrounded by the salt formation so nothing escapes to the surrounding strata or another cavern. Multiple caverns will typically be formed in a single salt dome. Presently, there are more than a 1,000 salt caverns being used in the U.S. and Canada to store hydrocarbons including the aforementioned crude oil stored in the Strategic Petroleum Reserve. In a "compensated" cavern, brine or water is pumped into the bottom of the salt cavern to displace the hydrocarbon or other product out of the cavern. The product floats on top of the brine or water. When product is injected into the cavern, the brine or water is forced out. Hydrocarbons do not mix with the brine or water making it an ideal fluid to use in a compensated salt cavern. Brine is typically used in a fully formed compensated cavern. However, fresh water or sea water may be used in early stage storage, such as the U.S. Strategic Petroleum Reserve, to further enlarge the size of the cavern. The term "compensating liquid" as used herein includes brine, fresh water, sea water and combinations thereof.

U.S. Pat. No. 5,511,905 is owned by the assignee of the present application and is an example of natural gas storage in a compensated salt cavern. William M. Bishop is listed as a joint inventor on the present application and the '905 patent. This prior art patent discloses warming of LNG with brine (at approximately 90° F.) using a heat exchanger in a compensated salt cavern. This prior patent teaches storage in the dense phase in the compensated salt cavern. The '905 Patent does not disclose use of an uncompensated salt cavern. The '905 Patent also discloses that cold fluids may be warmed using a heat exchanger at the surface. The surface heat exchanger might be used where the cold fluids being off-loaded from a tanker are to be heated for transportation through a pipeline. The brine passing through the surface heat exchanger could be pumped from a brine pond rather than the subterranean cavern.

There are several drawbacks to the design disclosed in the '905 Patent. When a heat exchanger is located in the compensated salt cavern, maintenance is expensive and flow rates are restricted. Installation of subsurface safety valves is problematic.

3. Storage in Uncompensated Salt Caverns.

In "uncompensated" salt cavern storage, no displacing liquid is used.

Uncompensated salt caverns are commonly used to store natural gas that has been produced from wells. Sixty or more uncompensated salt caverns are currently being used in the U.S. to store natural gas. High-pressure compressors are used to inject the natural gas in an uncompensated salt cavern. Some natural gas should always be left in the cavern to prevent cavern closure due to salt creep. The volume of gas that should always be left in an uncompensated cavern is sometimes referred to in the industry as a "cushion." This gas provides a minimum storage pressure that must be maintained in the cavern. To the best of Applicants knowledge, none of the operating LNG receiving facilities take the LNG from the tankers, vaporize it and then store the resulting gas in salt caverns. When natural gas was being sold at $2.00 MMBTU, not much attention was placed on the value of the "cushion" gas required in uncompensated salt caverns. However, natural gas in the U.S. has recently sold for as much a $14.00 MMBTU and the cost of the "cushion" has become a factor in selection of compensated versus uncompensated salt cavern storage.

The following U.S. Patents are examples of uncompensated salt cavern storage techniques: U.S. Pat. Nos. 6,739,140; 6,880,348; 6,848,502; 6,813,893 and 6,945,055. These patents list William Bishop as a joint inventor and are assigned the assignee of the present application.

Uncompensated salt caverns for natural gas storage preferably operate in a temperature range of approximately +40° F. to +1 40° F. and pressures of 1500 to 4000 psig. If a cryogenic fluid at sub-zero temperature is pumped into a cavern, thermal fracturing of the salt may occur and degrade the integrity of the salt cavern. For this reason, LNG at very low temperatures cannot be stored in conventional salt caverns. If a fluid is pumped into a salt cavern and the fluid is above 140° F. it will encourage creep and decrease the volume of the salt cavern.

Storage of natural gas in an uncompensated salt cavern is known and utilized between natural gas production facilities and natural gas markets to provide a buffer to swings in supply of natural gas and to swings in demand for natural gas. Swings in supply from gas production wells can be caused by weather phenomenon such as freezes or hurricanes or in the normal maintenance associated with natural gas production facilities. Swings in natural gas demand can be weather related such as demand for heating in cold weather or in demand for electricity generated from natural gas fueled generators. Storage of natural gas in uncompensated salt caverns is widely known as an excellent technology to accommodate very large demand increases in natural gas because of the ability of salt caverns to deliver large amounts of natural gas to pipelines on very short notice.

The U.S. on average consumes about 60 billion cubic feet per day (Bcf/D) of natural gas but in peak demand periods can consume in excess of 115 Bcf/D. Natural gas storage is used to accommodate that wide variation in demand. As previously mentioned, there is over 3 trillion cubic feet (TCF) of natural gas storage capacity in the US of which about 95% is storage of natural gas in depleted reservoirs and aquifers and the remaining 5% in salt caverns. While salt caverns make up only about 5% of the storage capacity they provide more than 14% of the delivery capacity illustrating that salt caverns have much higher deliverability than other forms of storage. Salt caverns are characterized as having very high deliverability instantaneously available to be delivered to the pipeline grid.

The U.S. has the most comprehensive energy infrastructure in the world. The U.S. is the largest energy consuming nation in the world and there are projections that the demand for natural gas and the swings in that demand will increase in the future. There is an extensive pipeline network both offshore and onshore that transports this natural gas from the wellhead to market. Much of the natural gas used in the United States is produced along the Gulf Coast, where there is an abundance of natural gas pipeline distribution networks in proximity to navigable waters. An abundance of natural gas pipeline networks is sometimes referred to as the natural gas infrastructure.

Currently the U.S. consumes more natural gas than it produces. The shortfall in supply is largely made up by pipeline imports from Canada. Only about 1% of the current U.S. natural gas demand is supplied by imported LNG. However there are projections by the Energy Information Agency of the U.S. Department of Energy that in the future imported LNG could supply as much as 6% of demand. Some gas industry projections are that imported LNG could grow to supply more than 10% of demand.

Uncompensated salt caverns are used to store natural gas that has been produced from wells and transported to the salt caverns via pipelines. Storage of natural gas sourced from pipelines in uncompensated salt caverns is well known to those skilled in the art. Generally pipelines operate at pressures lower than the maximum operating pressures of salt caverns therefore high-pressure compressors are used to boost the pressure from the pipelines and inject the natural gas in to salt caverns. Uncompensated salt caverns for natural gas storage are preferably operated in a temperature range of approximately +40° F. to +140° F. and pressures from about 1500 to about 4000 psig. Salt has varying degrees of plasticity depending primarily upon temperature and pressure. The hot discharge from natural gas compressors is commonly cooled prior to injection into salt caverns to temperatures below +140° F. to reduce salt movement or "creep." Salt caverns store natural gas at pressures exceeding the operating pressures of the pipelines to which they are connected so the general method of delivery from the caverns to the pipelines is by the positive pressure differential from the cavern to the pipelines. In periods of high natural gas demand salt cavern storage facilities are depleted rapidly and generally the storage inventories are not replenished until periods of low natural gas demand. The practice in the industry of filling a salt cavern storage facility and then redelivering the inventory to a natural gas pipeline network is called a turnaround or turn. The number of turns a facility can perform during a period of time is a measure of its utilization. In periods of continued high demand for natural gas such as in a prolonged cold wave there may be an inability to refill the salt cavern storage facility because of the general inability of the U.S. domestic production of natural gas to match the high rates of natural gas consumption. In general natural gas production from production wells is at a relatively steady rate while consumption of natural gas in the U.S. is highly variable and subject to significant peaks and valleys. Salt cavern storage facilities are recognized as an excellent way to fill the gaps in supply and demand on a quick response basis. The trend in the U.S. to build more gas fueled electrical generating facilities will exacerbate the swings in demand since a gas fueled generation plant is characterized by the ability to rapidly shift its output which could increase its fuel requirement as much as 50% in a short time period.

In the U.S. there are more than 60 uncompensated salt caverns utilized for storing natural gas sourced from pipelines. To the best of the Applicant's knowledge, none of the existing uncompensated salt caverns used for natural gas storage are also used for the receipt and storage of natural gas sourced from LNG.

When a new LNG receiving terminal is being designed the engineers need to decide on whether to use an uncompensated salt cavern or a compensated salt cavern for storage of the warmed natural gas. As discussed above, U.S. Pat. No. 5,511,905 describes a compensated salt cavern storage technique and U.S. Pat. Nos. 739,140; 6,880,348; 6,848,502; 6,813,893 and 6,945,055 describe uncompensated salt cavern storage techniques. Designers need to compare the cost of the "cushion" gas in an uncompensated salt cavern versus the extra costs of a compensated salt cavern including: the cost of the brine pond, the brine pumps and associated piping. The "cushion" gas can amount to about ⅓ of the total gas in an uncompensated cavern, so the cost is significant considering today's higher gas prices. There is a need to substantially eliminate the expensive "cushion" gas which dictates use of a compensated salt cavern. Substantial elimination of the "cushion gas" does not remove all the gas from a compensated salt cavern. Those skilled in the art recognize that there is always a little gas or other product at the top of a compensated cavern after it has been "filed" with brine or other compensating liquid. However, the little gas remaining in a compensated cavern that is "full" of brine or other compensating liquid is substantially less that the "cushion" required in an uncompensated salt cavern. The present invention overcomes some of the drawbacks concerning storage in a compensated salt cavern inherent in the designs of an in-the-cavern heat exchanger as shown in prior U.S. Pat. No. 5,511,905.

SUMMARY OF THE INVENTION

The Bishop One-Step Process warms a cold fluid using a heat exchanger mounted onshore or a heat exchanger mounted offshore on a platform or subsea and stores the resulting DPNG in an compensated salt cavern. In an alternative embodiment, a conventional LNG vaporizer system can also be used to gasify a cold fluid prior to storage in an compensated salt cavern or transmission through a pipeline.

The term "cold fluid" as used herein means liquid natural gas (LNG), liquid petroleum gas (LPG), liquid hydrogen, liquid helium, liquid olefins, liquid propane, liquid butane, chilled compressed natural gas and other fluids that are maintained at sub-zero temperatures so they can be transported as a liquid rather than as gases. The heat exchangers of the present invention use a warm fluid to raise the temperature of the cold fluid. This warm fluid used in the heat exchangers will hereinafter be referred to as warmant. Warmant can be fresh water or seawater. Other warmants from industrial processes may be used where it is desired to cool a liquid used in such a process.

To accomplish heat exchange in a horizontal flow configuration, such as the Bishop One-Step Process, it is important that the cold fluid be at a temperature and pressure such that it is maintained in the dense or critical phase so that no phase change takes place in the cold fluid during its warming to the desired temperature. This eliminates problems associated with two-phase flow such as stratification, cavitation and vapor lock.

The dense or critical phase is defined as the state of a fluid when it is outside the two-phase envelope of the pressure-temperature phase diagram for the fluid (see FIG. 9). In this condition, there is no distinction between liquid and gas, and density changes on warming are gradual with no change in phase. This allows the heat exchanger of the Bishop One-Step Process to reduce or avoid stratification, cavitation and vapor lock, which are problems with two-phase gas-liquid flows.

FIGS. 1-11 deal with "uncompensated" salt cavern storage. FIGS. 12 and 13 deal with "compensated" salt cavern storage. The present invention locates a heat exchanger on the surface, rather than in a compensated salt cavern. In offshore applications, the heat exchanger can be located on a platform, on the leg of a platform or on the seabed, but it is not located in the compensated salt cavern. Each compensated salt cavern has two or more wells per cavern. One of the wells is dedicated to gas and the other well or wells are dedicated to a compensating liquid which is typically brine. This compensated salt cavern storage technique eliminates the need for "cushion" gas, because the salt cavern can be substantially filled with the compensating liquid to expel all of the stored gas. A surface mounted heat exchanger eliminates the concerns caused by prior art in-the-well heat exchangers.

BRIEF DESCRIPTION OF DRAWINGS

FIG. 2 is an enlarged section view of the heat exchanger of FIG. 1. The flow arrows indicate a parallel flow path. Surface reservoirs or ponds are used to store the warmant.

FIG. 3 is a section view of the heat exchanger of FIG. 2 except the flow arrows now indicate a counter-flow path. Surface reservoirs or ponds are used to store the warmant.

FIG. 6 is a section view of a portion of the heat exchanger along the lines 6-6 of FIG. 2.

FIG. 7 is a section view of an alternative embodiment of the heat exchanger.

FIG. 8 is a section view of a second alternative embodiment of the heat exchanger.

DETAILED DESCRIPTION OF DRAWINGS

Figure 1:
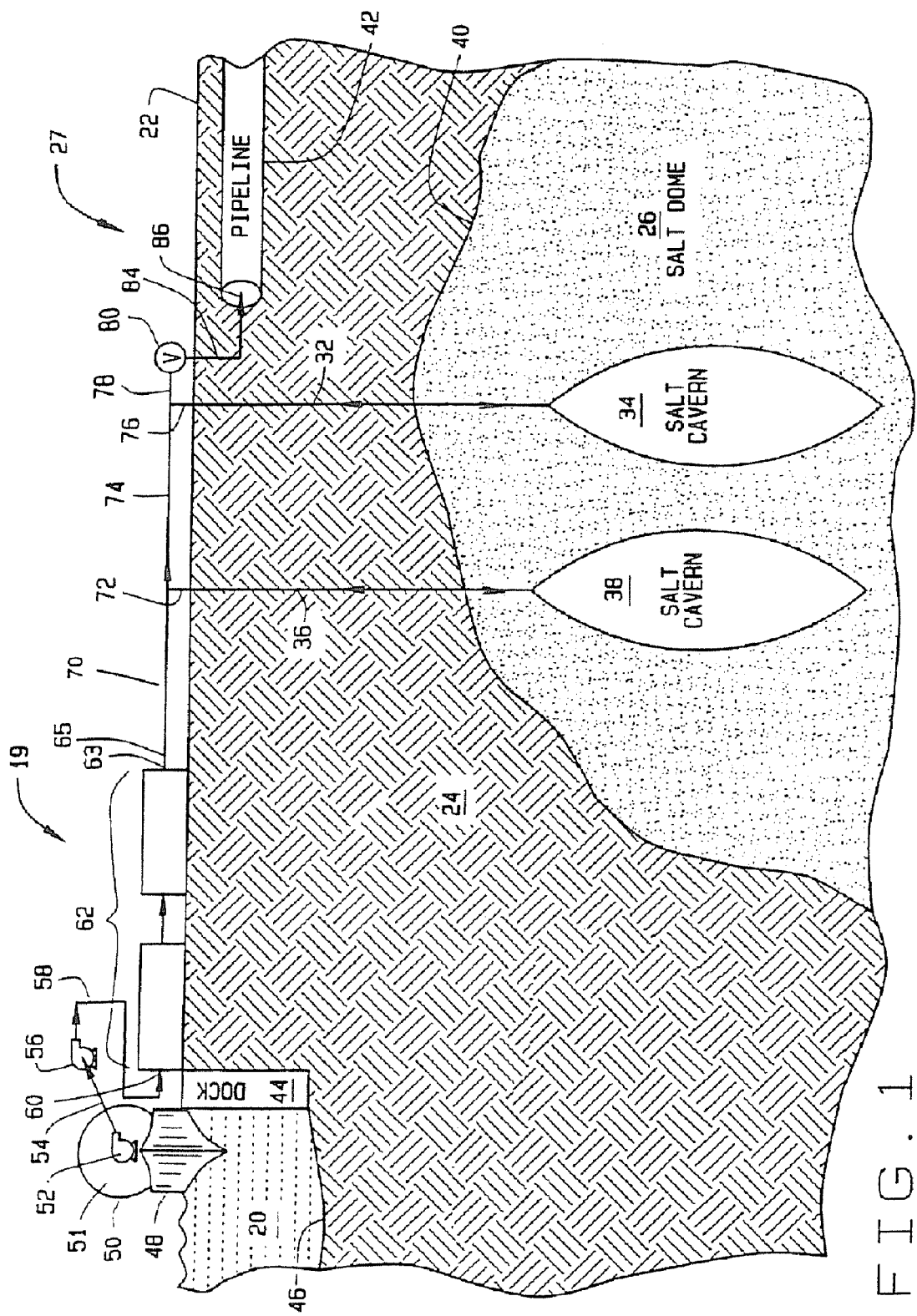
FIG. 1 is a schematic view of the apparatus used in the Bishop One-Step Process including a dockside heat exchanger, salt caverns and a pipeline.

FIG. 1 is the schematic view of the apparatus used in the Bishop One-Step Process including a dockside heat exchanger for converting a cold fluid to a dense phase fluid for delivery to various subsurface storage facilities and/or a pipeline (FIG. 1 is not drawn to scale.). The entire onshore facility is generally identified by the numeral 19. Seawater 20 covers much, but not all, of the surface 22 of the earth 24. Various types of strata and formations are formed below the surface 22 of the earth 24. For example, a salt dome 26 is a common formation along the Gulf Coast both onshore 27 and offshore.

A well 32 extends from the surface 22 through the earth 24 and into the salt dome 26. An uncompensated salt cavern 34 has been washed in the salt dome 26 using techniques that are well known to those skilled in the art. Another well 36 extends from the surface 22, through the earth 24, the salt dome 26 and into a second uncompensated salt cavern 38. The upper surface 40 of the salt dome 26 is preferably located about 1500 feet below the surface 22 of the earth, although salt domes occurring at other depths both onshore 27 or offshore 28 may also be suitable. A typical cavern 34 may be disposed 2,500 feet below the surface 22 of the earth 24, have an approximate height of 2,000 feet and a diameter of approximately 200 feet. The size and capacity of the cavern 34 will vary. Salt domes and salt caverns can occur completely onshore 27, completely offshore 28 or somewhere in between. A pipeline 42 has been laid under the surface 22 of the earth 24.

A dock 44 has been constructed on the bottom 46 of a harbor, not shown. A cold fluid transport ship 48 is tied up at the dock 44. The cold fluid transport ship 48 typically has a plurality of cryogenic tanks 50 that are used to store cold fluid 51. The cold fluid is transported in the cryogenic tanks 50 as a liquid having a sub-zero temperature. Low-pressure pump systems 52 are positioned in the cryogenic tanks 50 or on the transport ship 48 to facilitate off loading of the cold fluid 51.

After the cold fluid transport ship 48 has tied up to the dock 44, an articulated piping system 54 on the dock 44, which may include hoses and flexible loading arms, is connected to the low-pressure pump system 52 on the transport ship 48. The other end of the articulated piping system 54 is connected to high-pressure pump system 56 mounted on or near the dock 44. Various types of pumps are used in the LNG industry including vertical, multistaged deepwell turbines, multistage submersibles and multistaged horizontal.

When it is time to begin the off loading process, the low-pressure pump system 52 and the high-pressure pump system 56 transfer the cold fluid 51 from the cryogenic tanks 50 on the transport ship 48 through hoses, flexible loading arms and articulated piping 54 and additional piping 58 to the inlet 60 of a heat exchanger 62 used in the present invention. When the cold fluid 51 leaves the high-pressure pump system 56 it has been converted to a dense phase fluid 64 because of the pressure imparted by the pump. The term dense phase is discussed in greater detail below concerning FIG. 9. The Bishop Process heat exchanger 62 will warm the cold fluid to approximately +40° F. or higher, depending on downstream requirements. This heat exchanger makes use of the dense phase state of the fluid and a high Froude number for the flow to ensure that stratification, phase change, cavitation and vapor lock do not occur in the heat exchange process, regardless of the orientation of the flow with respect to gravity. These conditions are essential to the warming operation and are discussed in detail below in connection with FIG. 9. When the cold fluid 51 leaves the outlet 63 of the heat exchanger 62, it is a dense phase fluid 64. A flexible joint 65 or an expansion joint is connected to the outlet 63 of the heat exchanger 62 to accommodate expansion and contraction of the cryogenically compatible piping 61, better seen in FIG. 2, inside the heat exchanger 62 (high nickel steel may be suitable for the piping 61).

Piping 70 connects the heat exchanger 62 with a wellhead 72, mounted on a well 36. Additional piping 74 connects the heat exchanger 62 with another wellhead 76, mounted on the well 32. The high-pressure pump system 56 generates sufficient pressure to transport the dense phase fluid 64 through the flexible joint 65, the piping 70, through the wellhead 72, the well 36 into the uncompensated salt cavern 38. Likewise the pressure from the high-pressure pump system 56 will be sufficient to transport the dense phase fluid 64 through the flexible joint 65, the piping 70 and 74, through the wellhead 76 and the well 32 into the uncompensated salt cavern 34. Dense phase fluid 64 therefore can be injected via the wells 32 and 36 for storage into uncompensated salt caverns 34 and 38.

In addition, dense phase fluid 64 can be transferred from the heat exchanger 62 through piping 78 to a throttling valve 80 or regulator which connects via additional subsurface or surface piping 84 to the inlet 86 of the pipeline 42. The dense phase fluid 64 is then transported via the pipeline 42 to market. (The pipeline 42 may also be on the surface.)

FIG. 2 is enlarged section view of the Bishop Process heat exchanger 62. (FIG. 2 is not drawn to scale.) The heat exchanger 62 can be formed from one section or multiple sections as shown in FIG. 2. The number of sections used in the heat exchanger 62 depends on the spatial configuration and the overall footprint of the facility 19, the temperature of the cold fluid 51, the temperature of the warrant 99 and other factors. The heat exchanger 62 includes a first section 100 and a second section 102. The term "warmant" as used herein means fresh water 19 (including river water) or seawater 20, or any other suitable fluid including that participating in a process that requires it to be cooled, i.e. a condensing process.

The first section 100 of the heat exchanger 62 includes a central cryogenically compatible pipe 61 and an outer conduit 104. (High nickel steel pipe may be suitable in this low temperature application). The interior cryogenically compatible conduit 61 is positioned at or near the center of the outer conduit 104 by a plurality of centralizers 106, 108 and 110.

A warmant 99 flows through the annular area 101 of the first section 100 of heat exchanger 62. The annular area 101 is defined by the outside diameter of the cryogenically compatible pipe 61 and the inside diameter of the outer conduit 104.

The second section 102 of the heat exchanger 62 is likewise formed by the cryogenically compatible pipe 61 and the outer conduit 112. The cryogenically compatible pipe 61 is positioned, more or less, in the center of the outer conduit 112 by a plurality of centralizers 114, 116 and 118. All of the centralizers, 106, 108, 110, 114, 116 and 118, are formed generally the same as shown in FIG. 6.

A first surface reservoir 120, sometimes referred to as a pond, and a second surface reservoir 122 are formed onshore 27 near the heat exchanger 62 and are used to store warmant 99. Piping 124 connects the first reservoir 120 with a low-pressure pump 126. Piping 128 connects the low-pressure pump 126 with ports 130 to allow fluid communication between the reservoir 122 and the first section 100 of heat exchanger 62. The warmant flows through the annular area 101 as indicated by the flow arrows and exits the first section 100 of the heat exchanger 62 at ports 132 as indicated by the flow arrows. Additional piping 134 connects the ports 132 with the second reservoir 122.

Piping 136 connects the first reservoir 120 with low-pressure pump 138. Piping 140 connects low-pressure 138 with ports 142 formed in the second section 102 of the heat exchanger 62. The warmant is pumped from the first reservoir 120 through the pump 138 into the annular area 103 between the outside diameter of the cryogenically compatible pipe 61 and the inside diameter of the outer conduit pipe 112. The warmant 99 flows through the annular area 103 of the second section 102 of the heat exchanger 62 as indicated by the flow arrows and exits at the ports 144 which are connected by pipe 146 to the second reservoir 122. The cold fluid 51 enters the inlet 60 of the heat exchanger 62 as a cold liquid and leaves the outlet 63 as a warm dense phase fluid 64. The cryogenically compatible pipe 61 is connected to a flexible joint 65 to account for expansion and contraction of the cryogenically compatible pipe 61. All piping downstream of flexible joint 65 is not cryogenically compatible.

In the parallel flow configuration of FIG. 2, the heat exchanger 62 transfers warmant 99 from the first surface reservoir 120 through the first section 100 to the second reservoir 122. Likewise, additional warmant is transferred from the first reservoir 120 through the second section 102 of the heat exchanger 62 to the second reservoir 122. Over time, the volume of warmant 99 and the first reservoir 120 will be diminished and the volume of warmant 99 in the second reservoir 122 will be increased. It will therefore be necessary to move to a counter-flow arrangement better seen in FIG. 3 so that the warmant 99 can be transferred from the second reservoir 122 back to the first reservoir 120. In an alternative arrangement, that avoids the necessity for counter-flow, the warmant 99 can be returned from the first section 100 through piping 148, shown in phantom, to the first reservoir 120 allowing for continuous parallel flow through the first section 100 of the heat exchanger 62. In a similar arrangement, the warmant from the second section 102 is transferred from a second reservoir 122 through piping 150, shown in phantom, to the pump 138. In this fashion, the warmant 99 is continually cycled in a parallel flow through the second section 102 of the heat exchanger 62. If river water is used as the warmant 99, the surface ponds 120 and 122 are not needed. Instead, the piping 124 connects to a river, as does the piping 136,134 and 146. When river water is used as a warmant 99 it is always returned to its source and the piping is modified accordingly.

It is important to avoid freeze-up of the heat exchanger 62. Freeze-up blocks the flow of warmant 94 and renders the heat exchanger 62 inoperable. It is also important to reduce or eliminate icing. Icing renders the heat exchanger 62 less efficient. It is therefore necessary to carefully design the area, generally identified by the numeral 63 where the cold fluid 51 in the pipe 61 first encounters the warmant 99 in the annular area 101 of the first section 100 of the heat exchanger 62. Here it is necessary to prevent or reduce freezing of the warmant 99 on the pipe 61, which could block the ports, 130 and the annular area 101. In most cases, it is possible to choose flow rates and pipe diameter ratio such that freezing is not a problem. For example, if a dense phase natural gas expands by a factor of four in the warming process, the heat balance then indicates that the warmant flow rate is required to be four times that of the inlet dense phase. This results in a diameter ratio of two (outer pipe/inner pipe) in order to balance friction losses in the two paths. However, the heat transfer rate is improved if the diameters are closer together. An optimum ratio is approximately 1.5. Where conditions are extreme, it is possible to prevent local freezing by increasing the thermal insulation at the wall of the cryogenically compatible pipe 61 in this region 63. One method for doing this is to simply increase the wall thickness of the pipe 61. This has the effect of pushing some of the warming function downstream to where the cold fluid 51 has already been warmed to some extent, and the possibility of freezing has been reduced. This may also increase the length of the heat exchanger.

FIG. 3 is an enlarged section view of the Bishop Process heat exchanger 62 in a counter-flow mode. (FIG. 3 is not drawn to scale.) Warmant 99 is transferred from the second reservoir 122 through piping 200, the pump 202, piping 204, the ports 144 into the annular area 103 of the second section 102 of the heat exchanger 62 as indicated by the flow arrows. The warmant 99 exits the annular area 103 through the ports 142 and travels through the piping 206 to the first reservoir 120. Low-pressure pump 138 transfers warmant 99 from the second reservoir 122 through piping 150, 206 and the ports 132 into the annular area 101 of the first section 100 of the heat exchanger 62 as indicated by the flow arrows. The warmant 99 leaves the annular area 102 of the first section 100 through the ports 130 and piping 210 to return to the first reservoir 120. This counter-flow circuit continues until most of the warmant 99 has been transferred from the second reservoir 122 back to the first reservoir 120.

In an alternative flow arrangement, the warmant 99 leaves the annular area 103 through the ports 142 and is transferred through the piping 212, shown in phantom, back to the second reservoir 122 making a continuous loop from and to the second reservoir 122. Likewise warmant 99 can be transferred from the first reservoir 120 through piping 214, as shown in phantom, to the pump 138, piping 206 through the ports 132 into the annular area 101 of the first section 100 of the heat exchanger 62. The warmant is then returned through the ports 130 and the piping 210 to the first reservoir 120.

The design of the heat exchanger 62 and the number of surface reservoirs is determined by a number of factors including the amount of space that is available and ambient temperatures of warmant 99. For example, if the warmant 99 has an average temperature of more than 80° F., the heat exchanger 62 may only need one section. However, if the warmant 99 is on average less than 80° F., two or more segments may be necessary, such as the two-segment design shown in FIGS. 2 and 3. Surface reservoirs that are relatively shallow and have a large surface area are desirable for this purpose because they act as a solar collector raising the temperature of the warmant 99 during sunny days. This alternative arrangement constitutes a continuous counter-flow loop from and to the first reservoir 120. In the alternative, if the river water is being used as the warmant, no reservoirs may be required. In the case of river water, it may simply be returned to the river.

Examples 1-4 deal with "uncompensated" salt caverns and examples 5 and 6 deal with "compensated" salt caverns which require a compensating liquid.

EXAMPLE #1

This hypothetical example is designed to give broad operational parameters for the Bishop One-Step Process conducted at or near dockside as shown in FIG. 1. A number of factors must be considered when designing the facility 19 including the type of cold fluid and warmant that will be used. Conventional instrumentation for process measurement, control and safety are included in the facility as needed including but not limited to: temperature and pressure sensors, flow measurement sensors, overpressure reliefs, regulators and valves. Various input parameters must also be considered including, pipe geometry and length, flow rates, temperatures and specific heat for both the cold fluid and the warmant. Various output parameters must also be considered including the type, size, temperature and pressure of the uncompensated salt cavern. For delivery directly to a pipeline, other output parameters must also be considered such as pipe geometry, pressure, length, flow rate and temperature. Other design parameters to prevent freeze-up include temperature of the warmant at the inlet and the outlet of each section of the heat exchanger, temperature in the reservoirs, and the temperature at the initial contact area 63. Other important design considerations include the size of the cold fluid transport ship and the time interval during which the ship must be fully offloaded and sent back to sea.

Assume that 800,000 barrels of LNG (125,000 cubic meters) are stored in the cryogenic tanks 50 on the transport ship 48 at approximately one atmosphere and a temperature of −250° F. or colder. The low-pressure pump system 52 has the following general operational parameters: approx. 22,000 gpm (5000 m3/hr) with approx. 600 horsepower to produce a pressure of approximately 60 psig (4 bars). Due to frictional losses approximately 40 psig is delivered to the intake of the high-pressure pump system 56. The high-pressure pump system 56 will raise the pressure of the LNG typically to 1860 psig (120 bars) or more so that the cold fluid 51 will be in the dense phase after it leaves the high-pressure pump system 56. There are approximately ten pumps in the high-pressure pump system 56, each with a nominal pumping rate of 2,200 gpm (500 m3/hr) at a pressure increase of 1860 psig (120 bars), resulting in approximately 1900 psig (123 bars) available for injection into the uncompensated salt caverns 34 and 38. The total required horsepower for the ten high-pressure pump system is approximately 24,000 hp. This represents the maximum power required when the uncompensated salt caverns are fully pressured, i.e. when they are full. The average fill rate may be higher than 22,000 gpm (5000 m3/hr). Assuming 13⅜" nominal diameter pipe in the injection wells 32 and 36, approximately four uncompensated salt caverns having a minimum total capacity of approximately 3 billion cubic feet. The volume of the LNG will generally expand by a factor 2-4 during the heat exchange process, depending on the final pressure in the uncompensated salt cavern. Larger injection wells are feasible, along with more caverns if higher flows are needed.

Pumps 124 and 138 for the warmant 99 will be high-volume, low-pressure pump system with a combined flow rate of about 44,000 gpm (10,000 m3/hr) at about 60 psig (4 bars). The flow rate of the warmant through the heat exchanger 62 will be approximately two to four times the flow rate of the LNG through the cryogenically compatible tubing 61. The flow rate of the warmant will depend on the temperature of the warmant and the number of sections in the heat exchanger. (Each section has a separate warmant injection point.) The warmant could be treated for corrosion and fouling prevention to improve the efficiency of the heat exchanger 62. As the dense phase fluid 64 passes through the heat exchanger 62 it warms and expands. As it expands, the velocity increases through the heat exchanger.

Assuming an LNG flow rate of 22,000 gpm the heat exchanger 62 could have a cryogenically compatible center pipe 61 with a nominal outside diameter of approximately 13⅜ inches and the outer conduits 104 and 112 could have a nominal outside diameter of approximately 20 inches. The overall length of the heat exchanger 62 would be long enough, given the temperature of the warmant and other factors to allow the dense phase fluid 64 to reach a temperature of about 40° F. This could result in an overall length of several thousand feet and perhaps in the neighborhood of 5,000 feet. Multiple warmant injection points and parallel flow lines can greatly reduce this length. Depending on the distance from the receiving point to the storage space, the length may not be a problem. Parallel systems may also be used depending on the size of the facility and the need for redundancy. Pipe size and length can be greatly reduced by dividing the LNG flow into separate parallel paths. Two parallel heat exchangers 62 could have a cryogenically compatible center pipe 61 with a nominal outside diameter of approximately 8 inches and the outer conduits 104 and 112 could have a nominal outside diameter of approximately 12 inches. Use of parallel heat exchangers 62 is a design choice dependent upon material availability, ease of construction, and distance to storage.

In addition, the heat exchanger 62 need not be straight. To conserve space, or for other reasons the heat exchanger 62 may adopt any path such as an S-shaped design or a corkscrew-shaped design. The heat exchanger 62 can have 90° elbows and 180° turns to accommodate various design requirements.

If the dense phase fluid 64 is to be stored in an uncompensated salt cavern 34, one first needs to determine the minimum operational pressure of the salt cavern 34. For example, hypothetically, if the uncompensated cavern 34 had a maximum operating pressure of about 2,500 psig, the high-pressure pump system 56 would have the ability to pump at 2,800 psig or more. Of course operating at less than maximum is also possible, provided that pressure exceeds about 1,200 psig to maintain dense phase.

If the cold fluid 51 is to be heated and transferred directly into the pipeline 42, one first needs to determine the operational pressure of the pipeline. For example, hypothetically, if the pipeline operates at 1,000 psig, the high-pressure pump system 56 might still need to operate at pressures above 1,200 psig to maintain the dense phase of the fluid 64 depending on the temperature-pressure phase diagram. In order to reduce the pressure of the dense phase fluid 64 to pipeline operating pressures, it passes through the throttling valve 80 or regulator prior to entering the pipeline 42. Heating might also be necessary at this point to prevent the formation of two-phase flow, i.e. to keep liquids from forming. Conversely, the heat exchanger could be lengthened to increase the temperature such that subsequent expansion and cooling does not take the fluid out of the dense phase.

After dense phase fluid 64 has been injected into the uncompensated caverns 34 and 38, it can be stored until needed. The dense phase fluid 64 may be stored in the uncompensated salt cavern at pressures well exceeding the operational pressures of the pipeline. Therefore, all that is needed to transfer the dense phase fluid from the salt cavern 34 and 38 is to open valves, not shown, on the wellheads 72 and 76 and allow the dense phase fluid to pass through the throttling valve 80 or regulator which reduces its operational pressure to pressures compatible with the pipeline. In conclusion, the well 32 acts both to fill and empty the uncompensated salt cavern 34 as indicated by the flow arrows. Likewise, well 36 acts to both fill and empty the salt cavern 38 as indicated by the flow arrows.

Figure 4:
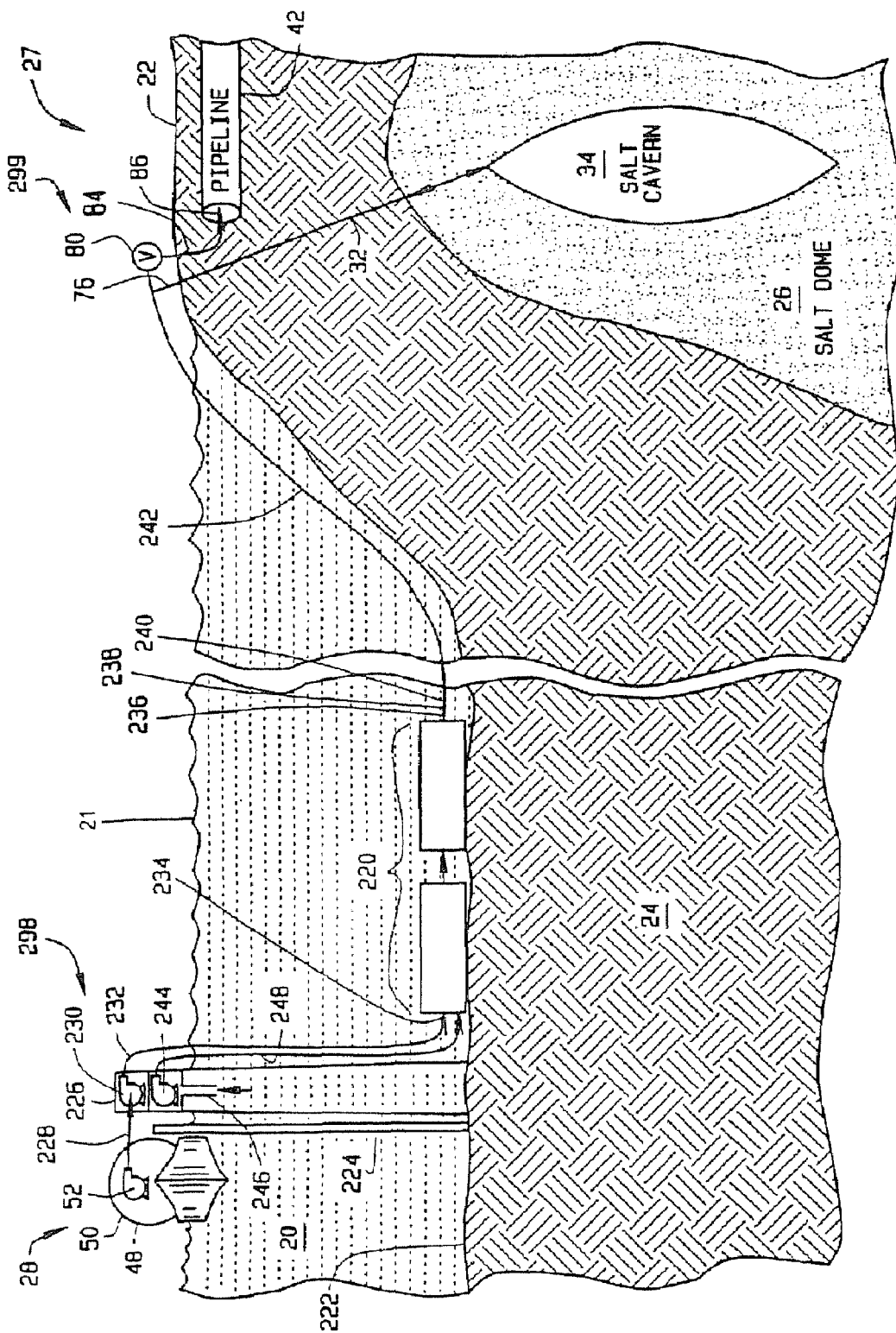
FIG. 4 is a schematic view of the apparatus used in the offshore Bishop One-Step Process including a heat exchanger mounted on the sea floor, salt caverns and a pipeline.

FIG. 4 is a schematic view of the apparatus used in the Bishop One-Step Process when a ship is moored offshore 28. (FIG. 4 is not drawn to scale.) The facility 298 is located offshore 28 and the facility 299 is located onshore 27. The offshore facility 298 may be several miles from land and is connected to the onshore facility 299 by a subsea pipeline 242.

A subsea Bishop Process heat exchanger 220 may be located on the sea floor 222 in proximity to the platform 226. In an alternative embodiment, not shown, the heat exchanger 220 could be mounted on the platform 226 above the surface 21 of the water 20. In a second alternative embodiment, not shown, the heat exchanger 220 could be mounted on and between the legs 227 (Best seen in FIG. 5) of the platform 226. When mounted on or between the legs 227, all or part of the heat exchanger 220 could be below the surface 21 of the water 20. The mooring/docking device 224 is secured to the sea floor 222 and allows cold fluid transport ships 48 to be tied up offshore 28. Likewise a platform 226 has legs 227, which are secured to the sea floor 222, and provides a stable facility for equipment and operations described below.

After the cold fluid transport ship 48 has been successfully secured to the mooring/docking device 228, articulated piping, hoses and flexible loading arms 228 are connected to the low-pressure pump system 52 located in the cryogenic tanks 50 or on board the transport ship 48. The other end of the articulated piping 228 is connected to a high-pressure pump system 230 located on the platform 226. Additional cryogenically compatible piping 232 connects the high-pressure pump system 230 to the inlet 234 of the subsea heat exchanger 220.

After the cold fluid 51 passes through the high-pressure pump system 230 it is converted into a dense phase fluid 64 and then passes through the heat exchanger 220. The fluid 64 stays in the dense phase as it passes through the heat exchanger 220. The outlet 236 of the heat exchanger 220 is connected to a flexible joint 238 or an expansion joint. The cryogenically compatible piping 235 in the heat exchanger 220 connects to one end of the flexible joint 238 and non-cryogenically piping 240 connects to the other end of the flexible joint 238. This allows for expansion and contraction of the cryogenically compatible piping 235. The subsea pipeline 242 is formed from non-cryogenically compatible piping.

The subsea pipeline 242 connects to a wellhead 76, which connects to the well 32 and the uncompensated salt cavern 34. Again, by opening valves, not shown, on the wellhead 76, dense phase fluid 64 can be transported from the subsea pipeline 242 through the well 32 and injected in the uncompensated salt cavern 34 for storage.

In addition, the dense phase fluid 64 can be transported through the subsea pipeline 242 to a throttling valve 80 or regulator which reduces the pressure and allows the dense phase fluid 64 to pass through the piping 84 into the inlet 86 of the pipeline 42 for transport to market.

After a sufficient amount of dense phase fluid 64 has been stored in the salt cavern 34, the valves, not shown, on the wellhead 76 can be shut off. This isolates the dense phase fluid 64 under pressure in the uncompensated salt cavern 34. In order to transfer the dense phase fluid 64 from the uncompensated salt cavern 34 to the pipeline 42, other valves, not shown, are opened on the wellhead 76 allowing the dense phase fluid which is under pressure in the uncompensated salt cavern 34 to move through the throttling valve 80 or regulator and the pipe 84 to the pipeline 42.

Because the pressure in the uncompensated salt cavern 34 is higher than the pressure in the pipeline 42, all that is necessary to get the dense phase fluid to market is to open one or more valves, not shown, on the wellhead 76 which allows the dense phase fluid 64 to pass through the throttling valve 80. The well 32 is used to inject and remove dense phase fluid 64 from the uncompensated salt cavern 34 as shown by the flow arrows.

Figure 5:
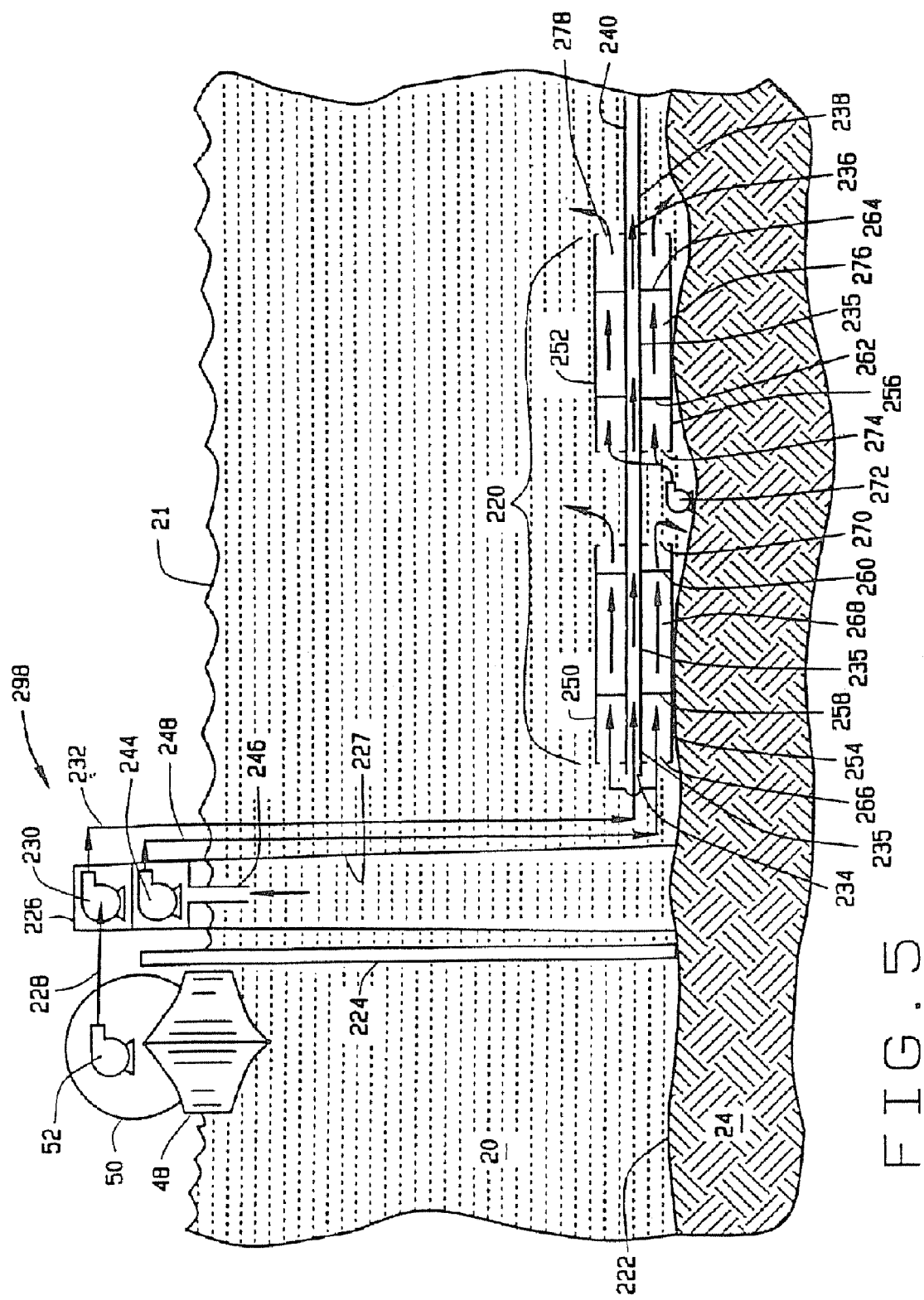
FIG. 5 is an enlarged section view of a portion of the equipment in FIG. 4 showing a parallel flow heat exchanger mounted on the sea floor.

FIG. 5 is an enlargement of the offshore facility 298 and subsea Bishop Process heat exchanger 220 of FIG. 4. (FIG. 5 is not drawn to scale.) The subsea heat exchanger 220 includes a first section 250 and a second section 252. The cryogenically compatible piping 235 is positioned in the middle of the outer conduits 254 and 256 by a plurality of centralizers 258, 260, 262 and 264. These centralizers used in the subsea heat exchanger 220 are identical to the centralizers used in the surface mounted heat exchanger 62 as better-seen in FIG. 6. Some slippage must be allowed between the centralizers and the outer conduits 254 and 256 to allow for expansion and contraction.

Cold fluids 51 leave the cryogenic storage tanks 50 on the cold fluid transport ship 48 and are pumped by the low-pressure pump 52 through the articulated piping 228 to the high-pressure pump system 230 located on the platform 226. The cold fluid 51 then passes through piping 232 to the inlet 234 of the subsea heat exchanger 220. The piping 228, 232 and 235 must be cryogenically compatible with the cold fluid 51.

The offshore heat exchanger 220 uses seawater 20 as a warmant 99. The warmant enters piping 246 on the platform 226 and passes through the low-pressure warmant pump 244. The warmant pump 244 may also be submersible. Piping 248 connects the low-pressure warmant pump 244 to the inlet ports 266 on the first section 250 of the heat exchanger 220. The warmant 99 passes through the annular area 268 between the outside diameter of the cryogenically compatible pipe 235 and the inside diameter of the pipe 254. The warmant 99 then exits the outlet ports 270 as indicated by the flow arrows. A submersible low-pressure pump 272 pumps additional warmant 99 into the second section 252 of the heat exchanger 220. In the alternative, the pump 272 could also be located on the platform 226. The warmant passes through the inlet ports 274 into the annular area 276 as indicated by the flow arrows. The annular area 276 is between the outside diameter of the cryogenically compatible pipe 235 and the interior diameter of the outer conduit 256. The warmant 99 exits the second section 252 through the outlet ports 278 as indicated by the flow arrows.

The cold fluid 51 enters the heat exchanger at the inlet 234 as a dense phase fluid 64 as it leaves the outlet 236 of the heat exchanger 220 as a dense phase fluid. The cryogenically compatible pipe 235 is connected to non-cryogenically compatible pipe 240 by a flexible joint 238 or an expansion joint. This allows the remainder of the subsea pipeline 242 to be constructed from typical carbon steels that are less expensive than cryogenically compatible steels. The heat exchanger 220 must be designed to avoid freeze-up and to reduce or avoid icing within the heat exchanger 62. Similar design considerations, previously discussed that apply to the heat exchanger 62 also apply to the heat exchanger 220.

EXAMPLE #2

This hypothetical example is designed to give broad operational parameters for the Bishop One-Step Process conducted offshore as shown in FIGS. 4 and 5. A number of factors must be considered when designing the facilities 298 and 299 including the type of cold fluid and the temperature of the warmant that will be used. Conventional instrumentation for process measurement, control and safety are included in the facility as needed including but not limited to: temperature and pressure sensors, flow measurement sensors, overpressure reliefs, regulators and valves. Various input parameters must also be considered including, pipe geometry and length, flow rates, temperatures and specific heat for both the cold fluid and the warmant. Various output parameters must also be considered including the type, size, temperature and pressure of the uncompensated salt cavern. For delivery directly to a pipeline, other output parameters must also be considered such as pipe geometry, pressure, length, flow rate and temperature. Other design parameters to prevent freeze-up include temperature of the warmant at the inlet and the outlet of each section of the heat exchanger, and the temperature at the initial contact area 235. Other important design considerations include the size of the cold fluid transport ship and the time interval during which the ship must be fully offloaded and sent back to sea.

Assume that 800,000 barrels of LNG (125,000 cubic meters) are stored in the cryogenic tanks 50 on the transport ship 48 at approximately one atmosphere and a temperature of $-250°$ F. or colder. The cold fluid transport ship 48 is moored to a dolphin 224 or some other suitable mooring/docking apparatus such as a single point mooring/docking or multiple anchored mooring/docking lines. LNG flows from the ship 48 through the low-pressure pump system 52, through hoses, flexible loading arms and/or articulated piping 228 to the high-pressure pump system 230 on the platform 226. The dense phase fluid 64 leaves the outlet of the high-pressure pump system 230 and enters the heat exchanger 220. The heat exchanger 220 is shown on the sea floor 222, but it could be located elsewhere as previously discussed. Also the heat exchanger 222 can assume various shapes as previously discussed in Example 1.

Ambient heated vaporizers are known in conventional LNG facilities (See pg. 69 of the Operating Section Report of the AGA LNG Information Book, 1981). According to the aforementioned Operating Section Report, "Most base load (ambient heated) vaporizers use sea or river water as the heat source." These are sometimes called open rack vaporizers. On information and belief, conventional open rack vaporizers generally operate at pressures in the neighborhood of 1,000-1,200 psig. These open rack vaporizers are different than the heat exchangers 62 and 220 used in the Bishop One-Step Process.

Comparison of heat exchangers used in the invention with conventional open rack vaporizers.

First, the heat exchangers in the Bishop One-Step Process easily accommodate higher pressures suitable for injection into uncompensated salt caverns. Typically, conventional vaporizer systems are not designed for operational pressures in excess of 1,200 psig.

Second, the sendout capacity of each conventional open rack vaporizer is substantially less than the sendout capacity of the heat exchangers used in the Bishop One-Step Process. On information and belief, several open rack vaporizers must be used in a bank to achieve the desired sendout capacity that can be achieved by one Bishop One-Step Process heat exchanger.

Third, the conventional open rack vaporizer is also believed to be more prone to ice formation and freezing problems that the heat exchangers in the Bishop One-Step Process. Vaporizers that avoid this problem sometimes use water-glycol mixtures, which introduce an environmental hazard.

Fourth, the heat exchanger used in the Bishop One-Step Process provides a needed path to the uncompensated salt cavern or pipeline, in addition to heating the fluid. The length of the exchanger can be varied by using alternate designs as needed.

Fifth, the heat exchanger used in the Bishop One-Step Process is easily flushed for cleaning, as with a biocide. There is little chance of clogging when doing this.

Sixth, the construction of the heat exchanger used in the Bishop One-Step Process is extremely simple from widely available materials, and can be done on site.

Seventh, the heat exchanger used in the Bishop One-Step Process can accommodate a wide range of cold fluids with no change in design—LNG, ethylene, propane, etc.

Eighth, the heat exchanger used offshore in the Bishop One-Step Process uses little space, (because it can be on the sea floor) which is highly advantageous on platforms. The weight contribution is also almost negligible.

Ninth and dependent on all of the above features, the heat exchanger used in the Bishop One-Step Process is extremely low cost both in capital and operations.

Recognizing some of these performance problems with open rack vaporizers, Osaka Gas has developed a new vaporizer called the SUPERORV, which uses seawater as the warmant. Drawings of the SUPERORV and conventional open rack vaporizers are shown on the Osaka Gas web site (www.osakagas.co.jp). The distinctions listed above between the heat exchanger used in the Bishop One-Step Process are likewise believed to be applicable to the SUPERORV.

FIG. 6 is a section view of the first section of the heat exchanger along the line 6-6 of FIG. 2. (FIG. 6 is not drawn to scale.) The coaxial heat exchanger 62 includes a center pipe 61 formed of material suitable for low temperature and high-pressure service, while the outer conduit 104 may be a material not suited for this service. This allows the outer conduit 104 to be formed from plastic, fiberglass or some other material that may be highly corrosion or fouling resistant, as it needs to be in order to transport the warmant 99 such as fresh water 19 or sea water 20. The annular area 101 between the outside diameter of the central pipe 61 and the inside diameter of the outer conduit 104 may need to be treated chemically periodically for fouling. The center pipe 61 will typically have corrosion resistant properties.

The center pipe 61 will be equipped with conventional centralizers 108 to keep it centered in the outer conduit 104. This serves two functions. Centralizing allows the warming to be uniform and thus minimize the occurrence of cold spots and stresses. Perhaps more importantly, the supported, centralized position allows the inner pipe 61 to expand and contract with large changes in temperature. The centralizer 108 has a hub 107 that surrounds the pipe 61 and a plurality of legs 109 that contact the inside surface of the outer conduit 104. The legs 109 are not permanently attached to the outer conduit 104 and permit independent movement of the inner pipe 61 and the outer conduit 104. This freedom of movement is important in the operation of the invention. To further permit expansion and contraction in the surface mounted heat exchanger 62 of FIG. 1, the outlet 63 is connected to a flexible joint 65 which also connects to non-cryogenically compatible piping 70. Likewise in subsea heat exchanger 220 of FIGS. 4 and 5, the outlet 236 is connected to a flexible joint 238 which also connects to non-cryogenically compatible piping 240. All of the centralizers that are used in this invention should allow movement (expansion, contraction and elongation) of the cryogenically compatible inner pipe independent of the outer conduit without causing significant abrasion and unnecessary wear on either. The cold fluid 51 passing through the cryogenically compatible piping is crosshatched in FIGS. 6, 7 and 8 for clarity.

FIG. 7 is a section view of an alternative embodiment of the heat exchanger used in the Bishop One-Step Process. In the alternative embodiment of FIG. 7, a central cryogenically compatible pipe 300 is centered inside of an intermediate cryogenically compatible pipe 302 by centralizers 304. The intermediate pipe 302 is centered inside the outer conduit 104 by centralizers 305. The centralizer 305 has a centralizer hub 302, which is held in place by a plurality of legs 306. An annular area 308 is defined between the outside diameter of the intermediate pipe 302 and the inside diameter of the outer conduit 104. Warmant 99 passes through the annular area 308. The legs 306 are not permanently attached to the inside of the outer conduit 104 to allow the cryogenically compatible pipes to expand and contract independent of the outer conduit 104. Warmant 99 also passes through the central pipe 300. The cold fluid 51 passes through the annular area 309 between the outside diameter of the central pipe 300 and the inside diameter of the centralizer hub 302. The cold fluid 51 in the annular area 309 is crosshatched in FIG. 7 for clarity. The alternative design of FIG. 7 has a greater heat exchange area and therefore the length of a heat exchanger using the alternative design of FIG. 7 may be shorter than the design in FIG. 6. In those circumstances where a relatively short heat exchanger may be preferable, the alternative design of FIG. 7 may be more suitable than the design of FIG. 6. In some circumstances, it may be necessary to develop even a shorter heat exchanger.

FIG. 8 is a section view of a second alternative embodiment of the heat exchanger used in the Bishop One-Step Process. Interior cryogenically compatible pipes 320, 322, 324 and 326 are held in a bundle and are centered inside the outer conduit 104 by a plurality of centralizers 327. The centralizers 327 have centralizer hubs 328. The interior pipes 320, 322, 324 and 326 are crosshatched to indicate that they carry the cold fluid 51. The centralizer hub 328 is positioned in the middle of the outer conduit 104 by legs 330, which are not permanently attached to the outer conduit 104. Warmant 99 passes through the annular area 334. The alternative embodiment of FIG. 8 should allow for even a shorter length heat exchanger than the design show in FIG. 7. When space is at a premium, alternative designs such as FIG. 7 and FIG. 8 may be suitable and other designs may also be utilized that increase the area of heat interface.

Figure 9:
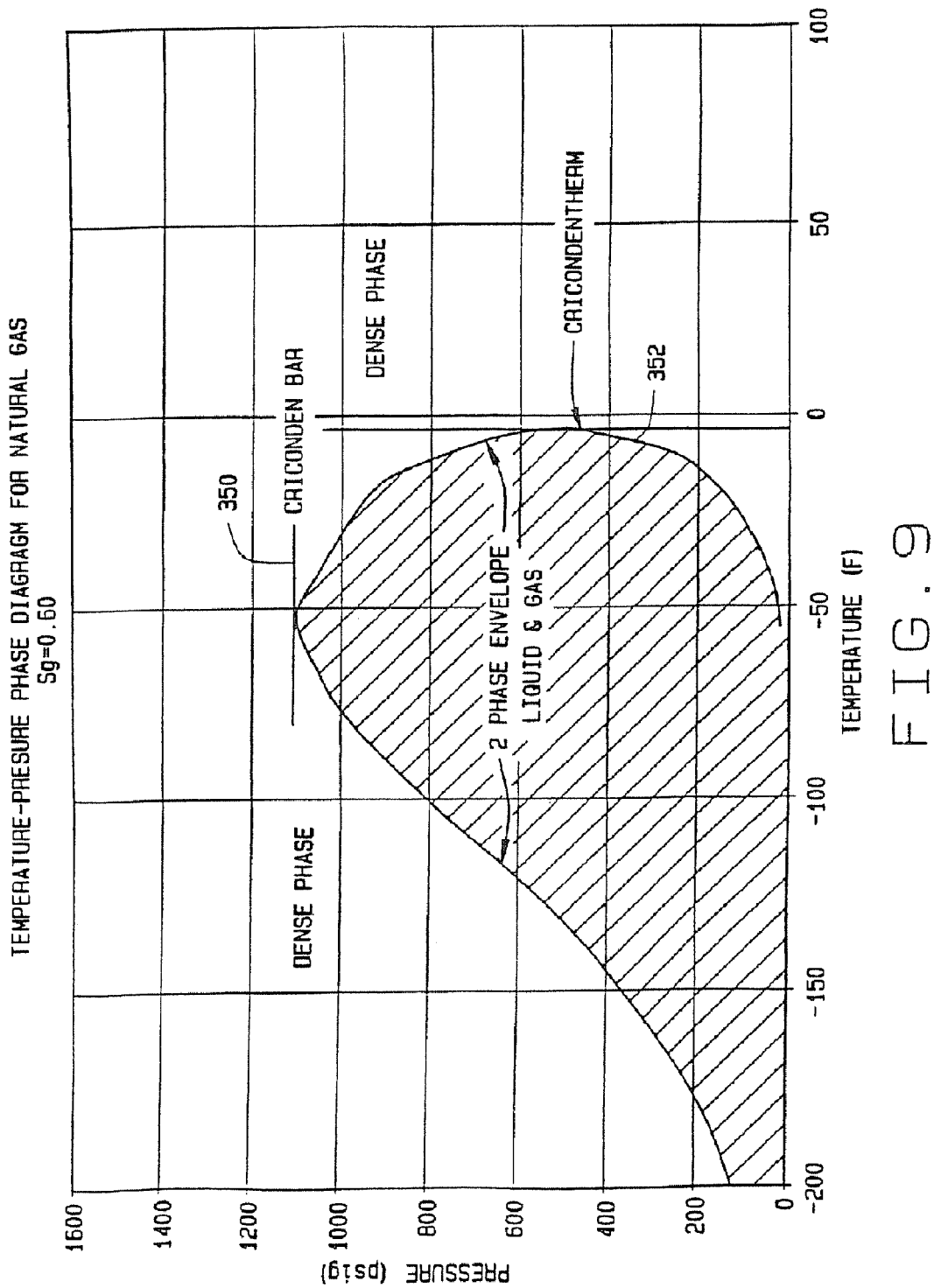
FIG. 9 is a temperature-pressure phase diagram for natural gas.

FIG. 9 is a temperature-pressure phase diagram for natural gas. Natural gas is a mixture of low molecular weight hydrocarbons. Its composition is approximately 85% methane, 10% ethane, and the balance being made up primarily of propane, butane and nitrogen. In flow situations where conditions are such that gas and liquid phases may coexist, pump, piping and heat transfer problems, discussed below, may be severe. This is especially true where the flow departs from the vertical. In downward vertical flow such as shown in U.S. Pat. No. 5,511,905, the liquid velocity must only exceed the rise velocity of any created gas phase in order to maintain uninterrupted flow. In cases approaching horizontal flow with a two-phase fluid, the gas can stratify, preventing the heat exchange, and in extreme cases causing vapor lock. Cavitation can also be a problem.

In the present invention, these problems are avoided by insuring that the cold fluid 51 is converted by the high-pressure pump system 56 or 230 into a dense phase fluid 64 and that it is maintained in the dense phase while a) it passes through the heat exchanger 62 or 220 and b) when it is stored in an uncompensated salt cavern. The dense phase exists when the temperature and pressure are high enough such that separate phases cannot exist. In a pure substance, for which this invention also applies, this is known at the critical point. In a mixture, such as natural gas, the dense phase exists over a wide range of conditions. In FIG. 9, the dense phase will exist as long as the fluid conditions of temperature and pressure lie outside the two-phase envelope (crosshatched in the drawing). This invention makes use of the dense phase characteristic so there is no change in phase with increase in temperature or pressure when starting from a point on the phase diagram above the cricondenbar 350 or to the right of the cricondentherm 352. This allows a gradual increase in temperature with a corresponding gradual decrease in density as the fluid is warmed and expanded in the heat exchanger 62 or 220. The result is a flow process where density stratification effects become insignificant. Operational pressures for the cold fluid 51 should therefore place the fluid 64 in the dense phase in the heat exchangers 62 or 220 and downstream piping and storage. In the case of some natural gas compositions, dense phase maintenance will require pressures different from the approximately 1,200 psig shown in the example in FIG. 9.

The effect of confining the fluid to the dense phase is illustrated by an analysis of the densimetric Froude Number F that defines flow regimes for layered or stratified flows:

$$F = V\left(gD\frac{\Delta\gamma}{\gamma}\right)^{-\left(\frac{1}{2}\right)}$$

Here V is fluid velocity, g is acceleration due to gravity, D is the pipe diameter and $\gamma$ is the fluid density and $\Delta\gamma$ is the change in fluid density. If F is large, the terms involving stratification in the governing equation of fluid motion dropout of the equation. As a practical example, two-phase flows in enclosed systems generally lose all stratification when the Froude Number rises to a range of from 1 to 2. In the present invention, the value of the Froude Number ranges in the hundreds, which assures complete mixing of any density variations. These high values are assured by the fact that in dense phase flow, the term $\Delta\gamma/\gamma$ in the equation above is small.

Measurement of the Froude Number occurs downstream of the high-pressure pump systems 56 and 230 and in the heat exchangers 62 and 220. In other words, the Froude Number, using the Bishop One-Step Process should be high enough to prevent stratification in the piping downstream of the high-pressure pump systems 56 and 230 and in the heat exchangers 62 and 220. Typically Froude Numbers exceeding 10 will prevent stratification. Note that conventional heat exchangers do not usually operate at pressures and temperatures high enough to produce a dense phase, and phase change problems may be avoided by other means.

In summary, using the present invention, the cold fluid 51 is kept in the dense phase by pressure as it leaves the high-pressure pump system 56 or 230 and thereafter as it passes through the heat exchangers 62 or 220 and while it is stored in uncompensated salt cavern.

Figure 10:
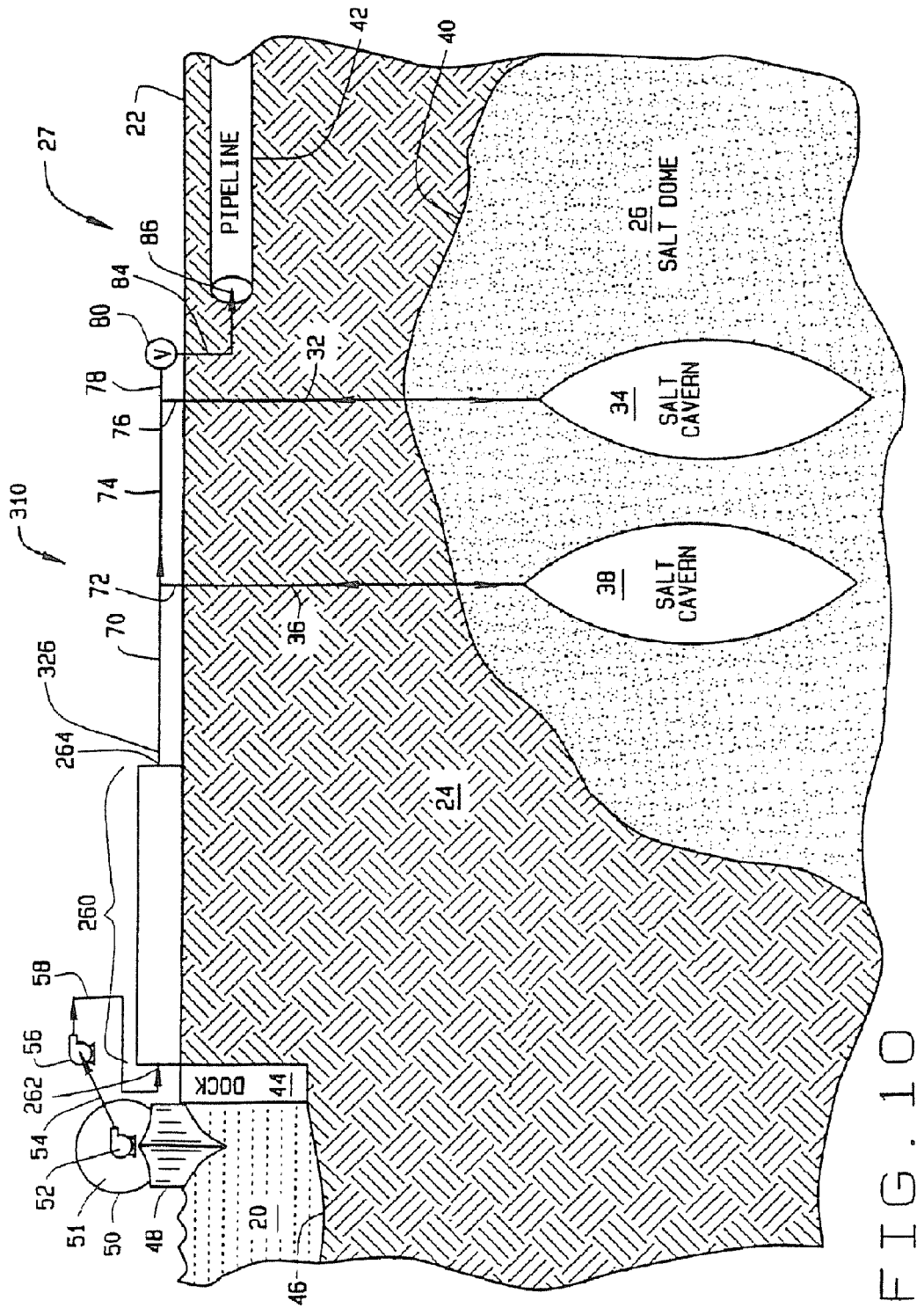
FIG. 10 is a schematic view of an alternative embodiment including a vaporizer system for gasification of cold fluids with subsequent storage in salt caverns without first going to a cryogenic storage tank.

FIG. 10 is a schematic diagram of an alternative embodiment of the present invention. The onshore facility 310 uses a conventional vaporizer system 260 to warm the cold fluid 51 prior to storage or transport.

Conventional LNG facilities offload LNG and store it onshore in cryogenic storage tanks as a liquid. In a conventional facility, the LNG is then run through a conventional vaporizer system to warm the liquid and convert it into a gas. The gas is odorized and transferred to a pipeline that transmits the gas to market. A simplified flow diagram of a conventional LNG vaporizer system is shown in FIG. 4.1 of the Operating Section Report of the AGA LNG Information Book, 1981, which is incorporated herein by reference. As discussed on page 64 of this document, various types of vaporizers are known including heated vaporizers, integral heated vaporizers, and remote heated vaporizers, ambient vaporizers and process vaporizers. Any of these known vaporizers could be used in the vaporizer system 260 of FIG. 10, provided they have the capacity to quickly offload the ship 48, and providing that they can withstand the pressures necessary for downstream injection into an uncompensated salt cavern.

In the alternative embodiment shown in FIG. 10, cold fluid 51 is offloaded from the transport ship 48 by the low-pressure pump system 52 located in the cryogenic storage tanks 50 or on the vessel 48. The cold fluid 51 passes through articulated piping 54 to another high-pressure pump system 56 located on or near the dock 44. The fluid 59 then passes through additional piping 58 to the inlet 262 of the conventional vaporizer 260. The fluid 59 passes from the inlet 261 through the vaporizer 260 to the outlet 264. Unlike Examples 1 and 2, it is not necessary in this alternative embodiment to have the fluid in the dense phase while it goes through the vaporizer nor are high Froude numbers required. Though not required, use of the dense phase is also acceptable. Therefore the fluid in this alternative embodiment has been assigned a different numeral, i.e. 59. The fluid 59 passes through the non-cryogenic piping 70 and the wellhead 72 through the well 36 to the uncompensated salt cavern 38. Likewise, the fluid 59 can pass through the non-cryogenic piping 74, the wellhead 76, the well 32, to the uncompensated salt cavern 34. When the uncompensated salt caverns 34 and 38 are full, valves, not shown, on the wellheads 76 and 72 can be shut off to store the gas in the uncompensated salt caverns 34 and 38.

Typically, the fluid 59 will be stored at a pressure exceeding pipeline pressures. Therefore, all that is necessary to transfer the fluid 59 from the uncompensated salt caverns 34 and 38 is to open valves, not shown, on the wellhead 76 and 72 allowing the gas 320 to pass through the piping 78 and the throttling valve 80 or a regulator, the piping 84 to the inlet 86 of the pipeline 42. Some additional heating may be necessary to the gas prior to entering the pipeline. Therefore, the wells 32 and 36 are used for injecting fluid 59 into the uncompensated salt caverns 34 and 38 and the wells are also used as an outlet for the stored fluid 59 when it is transferred to the pipeline 42. The flow arrows in the drawing therefore go in both directions indicating the dual features of the wells 32 and 36.

EXAMPLE #3

This hypothetical example is merely designed to give broad operational parameters for an alternative embodiment including a vaporizer system for warming of cold fluids with subsequent storage in uncompensated salt caverns and/or transportation through a pipeline, as shown in FIG. 10. Unlike conventional LNG facilities, no cryogenic tanks are used in the on-shore facility 310 of FIG. 10. (The ship 48, as previously mentioned, does contain cryogenic tanks 50.) A conventionally designed vaporizer system 260 is used in this alternative embodiment instead of the coaxial heat exchangers 62 and 220, discussed in the previous examples. The conventionally designed vaporizer system 260 will need to be modified to accept the higher pressures associated with uncompensated salt caverns (typically in the range of 1,500-2,500 psig). A number of factors must be considered when designing the facility 310 including the type of cold fluid and warmant that will be used. Conventional instrumentation for process measurement, control and safety are included in the facility as needed including but not limited to: temperature and pressure sensors, flow measurement sensors, overpressure reliefs, regulators and valves. Various input parameters must also be considered including, pipe geometry and length, flow rates, temperatures and specific heat for both the cold fluid and the warmant. Various output parameters must also be considered including the type, size, temperature and pressure of the uncompensated salt caverns. For delivery directly to a pipeline, other output parameters must also be considered such as pipe geometry, pressure, length, flow rate and temperature. Other important design considerations include the size of the cold fluid transport ship and the time interval during which the ship must be fully offloaded and sent back to sea.

A plurality of vaporizer systems 260 might be required to reach desired flow rates. The vaporizer systems used in this alternative embodiment must be designed to withstand operational pressures in the range of 1,500 to 2,500 psig to withstand the higher pressures necessary for subsurface injection.

Conventional vaporizer systems are designed to function with stratification. Unlike Examples 1 and 2, it is not necessary in this alternative embodiment to have the fluid in the dense phase while it goes through the vaporizer nor are high Froude numbers required. Though not required, use of the dense phase is also acceptable.

Referring to FIG. 10, LNG is pumped from the ship 48 using the low-pressure pump system 52, through the hoses or flexible loading arms 54 to the high-pressure pump system 56. The fluid 59 passes through the vaporizer system 260 where it is warmed. The fluid 59 then is injected into uncompensated salt caverns. Because the offload rate from the ship 48 and the storage pressures are similar, pump and flow rate characteristics described in Example 1 are applicable to Example 3. To Applicants knowledge, there is presently no conventional LNG facility using conventional vaporizers that subsequently injects gas into an uncompensated salt cavern.

Figure 11:
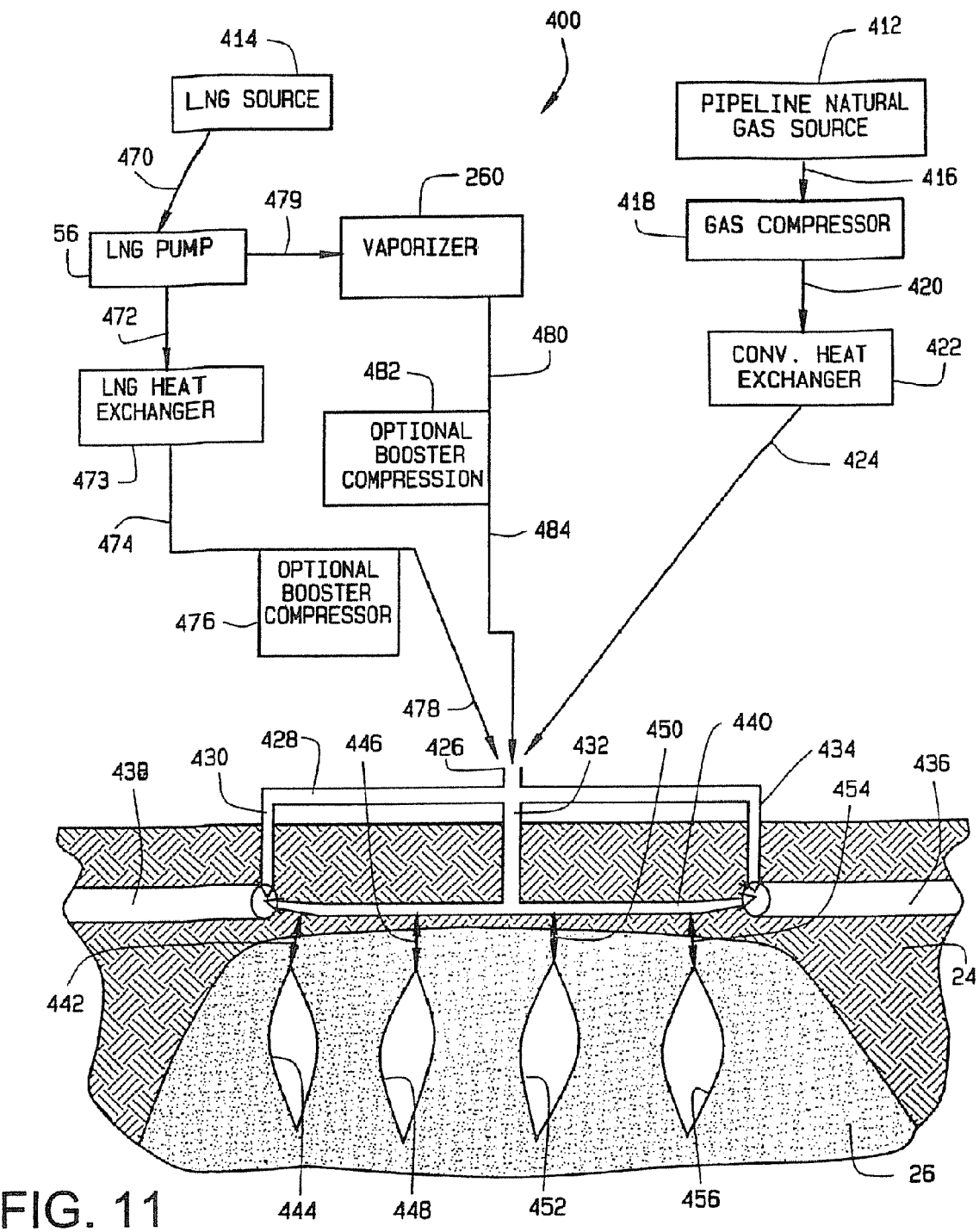
FIG. 11 is a block diagram of the Flexible Natural Gas Storage Facility including four salt caverns.

FIG. 11 is a block diagram of the Flexible Natural Gas Storage Facility with four salt caverns. The drawing is not to scale. The Flexible Natural Gas Storage Facility can have a single large cavern or several separate caverns. The four caverns in FIG. 11 are merely for illustrative purposes.

The Flexible Natural Gas Storage Facility is generally identified by the numeral 400. The Flexible Natural Gas Storage Facility 400 can receive fluid from a pipeline(s) natural gas source 412 and/or a LNG source 414. This gives the Facility 400 flexibility and economic advantages over conventional natural gas salt cavern storage facilities that receive gas solely from pipelines. The LNG source can be a cold fluid transport ship 48, not shown and/or a conventional LNG receiving terminal with surface mounted tanks. As previously discussed, the surface mounted tanks are not preferred, but as an add-on to an existing terminal may be advantageous.

The pipeline natural gas source 412 may be one or several pipelines that deliver natural gas 402, sometimes referred to as a first fluid. The pipeline natural gas source 412 is connected via piping 416 to a conventional natural gas compressor 418. The natural gas 402 flows from the pipeline natural gas source 412 to the compressor 418 where the natural gas is compressed to salt cavern pressure. The compression process also raises the temperature of the natural gas to about 200° F. The compressor 418 is connected via piping 420 to a conventional heat exchanger 422. The natural gas 402 flows from the compressor to the heat exchanger 422 where it is cooled to temperatures compatible with the salt cavern as previously explained. It is preferable, though not required, to raise the pressure of the gas from the pipeline source to dense phase levels for storage in a salt cavern. However, on some days during high drawdown, the cavern pressure may fall below dense phase levels.

The cooled, compressed natural gas 402 flows via piping 424 to the inlet 426 of the manifold 428. The manifold is connected to additional piping 430, 432 and 434 to allow distribution of natural gas to various components in the Facility 400. The piping 434 connects the inlet and the manifold to pipeline 436. The piping 430 connects the inlet and the manifold to the pipeline 438. A second manifold 440 connects to the first pipeline 436, the second pipeline 438 and the piping 430, 432 and 434. A well 442 connects first salt cavern 444 with the Facility 400. Fluid may flow from the Facility 400 into the cavern 444 or fluid may flow from the cavern 444 to another cavern or a pipeline as indicated by the bi-directional flow arrows. A second well 446 connects second salt cavern 448 with the Facility 400. Fluid may flow from the Facility 400 into the cavern 448 or fluid may flow from the cavern 448 to another cavern or a pipeline as indicated by the bidirectional flow arrows. A third well 450 connects third salt cavern 452 with the Facility 400. Fluid may flow from the Facility 400 into the cavern 452 or fluid may flow from the cavern 452 to another cavern or a pipeline as indicated by the bidirectional flow arrows. A fourth well 454 connects fourth salt cavern 456 with the Facility 400. Fluid may flow from the Facility 400 into the cavern 456 or fluid may flow from the cavern 456 to another cavern or a pipeline as indicated by the bidirectional flow arrows. The Facility 400 contains at least one salt cavern, but will typically contain two to five individual caverns. Four salt caverns are shown here solely for illustrative purposes.

Each of these salt caverns, 444, 448, 452 and 456 are in fluid communication with the other caverns in this Facility and the pipelines 436 and 438. This fluid communication is achieved through the first manifold 428, the second manifold 440, the piping 430, 432 and 434 and the wells 442, 446, 450 and 454. Various valves and other control mechanisms, not shown allow operators to control the flow of fluids in the Facility 400.

The LNG source 414 is connected via piping 470 to a high pressure cryogenic LNG pump 56. The LNG source 414 is sometimes simply referred to as "a source of second fluid." The LNG itself is sometimes simply referred to as "the second fluid." The pump 56 raises the pressure of the LNG to dense phase as previously discussed concerning FIG. 9. Piping 472 connects the pump 56 to the LNG heat exchanger 473. The heat exchanger 473 could be the Bishop Process Heat Exchanger 62 if the LNG source was on shore as shown in FIG. 1 or the heat exchanger 473 could be the Bishop Process Heat Exchanger 220 if the LNG source was offshore as shown in FIG. 4. The heat exchanger 473 warms the second fluid to temperatures that are compatible with a salt cavern, as previously explained. Piping 474 connects the heat exchanger 473 with an optional booster compressor 476. Piping 478 connects the optional booster compressor 476 with the inlet 426. In this manner, the LNG source 414 is in fluid communication with the pipelines 436 and 438 and the salt caverns 444, 448, 452 and 456. Likewise the pipeline natural gas source is in fluid communication with the pipelines 436 and 438 and the salt caverns 444, 448, 452 and 456. The pipelines 436 and 438 connect the Facility 400 with a market for natural gas, not shown.

A vaporizer 260 that has been modified to work at dense phase pressures (typically 1,000 psi and above) is connected to the LNG pump 56 via piping 479. Dense phase LNG from the pump 56 is heated in the vaporizer 260, as previously explained, to temperatures compatible with a salt cavern. Piping 480 connects the vaporizer 269 with an optional booster compressor 482. Piping 484 connects the optional booster compressor 482 with the inlet 426. In this manner, the LNG source 414 is in fluid communication with the salt caverns and the pipelines 436 and 438.

Many pipelines in the U.S. regulate the Btu content of the natural gas that is delivered to customers. This enables users of natural gas to plan and operate their facilities with predictable results. For example, some pipelines set 1050 Btu per standard cubic foot as a standard for delivered gas. If a bakery sets burners in bread baking ovens for the pipeline standard and the delivered gas actually has a Btu content of 1100 Btu per standard cubic foot, then the top of the bread might burn. This has been a challenge for LNG that is delivered from different parts of the world. For example, Algeria is known to have rich gas that may hit 1200 Btu per standard cubic foot. Other parts of the world, such as Trinidad have lean gas that may dip to 1140 Btus per standard cubic foot. In order to deliver gas to a pipeline standard, LNG importers have sometimes had to adjust their Btu content. This may require pumping air to pipeline pressure in order to reduce the Btu content of the gas. The cost for pumping the air increases operating expenses.

The Flexible Natural Gas Storage Facility 400 provides an easy and cost effective solution to Btu variances. One solution is to commingle rich gas and lean gas in the same salt cavern to achieve the Btu level required by the pipeline. Another solution is to put rich gas in a first salt cavern and lean gas in a second salt cavern. When it is time to deliver gas to a pipeline, some rich gas can be blended with some lean gas in a manifold or other piping system prior the delivery to the pipeline to achieve the Btu level required by the pipeline.

Because the Flexible Natural Gas Storage Facility 400 has access to multiple sources of natural gas, it has economic advantages over both conventional single source salt cavern storage facilities and conventional LNG receiving terminals. In the past 20 years, some conventional LNG receiving terminals in the U.S. have ceased operations due to low demand. This represents a large capital investment that is not being utilized. The Flexible Natural Gas Storage Facility 400 overcomes this market risk because it has access to multiple sources of natural gas. In periods where there is little or no LNG being imported into the U.S., the Facility 400 would still have economic value and activity because it could receive natural gas from a pipeline source and function as a natural gas storage facility. In periods where there are large amounts of LNG being imported into the U.S., the Facility 400 would have economic value and activity because it could be used primarily for receiving, storing and distributing natural gas from a LNG source. To applicant's knowledge, there is no multi-source natural gas salt cavern storage facility like the Flexible Natural Gas Storage Facility 400.

EXAMPLE #4

This hypothetical example is designed to give broad operational parameters for the Flexible Natural Gas Storage Facility 400 as shown in FIG. 11.

When the LNG source for the Flexible Natural Gas Storage Facility 400 is a cold fluid transport ship 48 offloading at a dock with a land based Bishop Process Heat Exchanger, then previous Example 1 is relevant. When the LNG source for the Flexible Natural Gas Storage Facility 400 is a cold fluid transport ship 48 moored to an offshore facility with an offshore Bishop Process Heat Exchanger, then previous Example 2 is relevant. In a typical situation, the high pressure LNG pump raises the pressure of the LNG to cavern pressure. The Bishop Process Heat Exchanger then warms the fluid to a temperature that is compatible with the salt cavern, typically about 40° F. The optional booster compressor may be necessary to replace pressure lost due to pipeline friction or pressure drops due to distance or pipeline sizing between the LNG pumps and the caverns. When a vaporizer is used with a LNG source, instead of a Bishop Process Heat Exchanger, then previous Example 3 is relevant. The high pressure LNG pump raises the LNG to cavern pressure. The vaporizer then heats the fluid to a temperature that is compatible with the salt cavern, typically to about 40° F. The optional booster compressor may be necessary to replace pressure lost due to friction, pipeline sizes, or distance from the vaporizers and the caverns.

Although not preferred, the Facility 400 could receive LNG from surface mounted tanks of a conventional LNG receiving terminal such as that currently in operation south of Lake Charles, La.

When receiving natural gas from a pipeline natural gas source, the Facility 400 compresses gas from the pipeline to cavern pressure and raises the temperature of the gas to about 200° F. The gas is then cooled in a conventional heat exchanger to about 140° F. or less and is injected into a salt cavern. In this example the gas from the pipeline natural gas source is raised to dense phase pressures, but this is not essential to the invention. All that's essential is that the gas be raised to sufficient pressure to be injected into the salt cavern. The facility 400, for example would have connections to one or more pipeline sources of natural gas. The facility 400 would have valving, piping, control, and measurement capability to both receive gas from the pipelines and deliver gas to the pipelines. This capability is sometimes called a bidirectional capability.

The Gas Compressor 418 could be a positive displacement or a centrifugal type compressor and would have sufficient capacity and horsepower to raise the pressure received from the Pipeline Natural Gas Source 412 from about 1000 psi to the pressure necessary to inject into the caverns 444,448,452, 456 or about 2000 psi. The cavern injection pressures are determined by the design of the caverns but the volume of injection or rate at which gas can be injected into the caverns are determined by the compressor design and horsepower. For this example it is assumed that the cavern injection design rate is 300 million cubic feet of gas injected per day up to the maximum operating pressures of the caverns. This injection rate would require about 25,000 horsepower of compression.

The compressed gas discharged from the compressor would be at 2,000 psi and about 200 Degrees F. and piped to the Conventional Heat Exchanger 422 for cooling before injection into the caverns. For this example the Conventional Heat Exchanger 422 would be a fin-fan type and designed to cool the compressor discharge from about 200 Degrees F. to less than 120 Degrees F. for injection into the caverns. No further processing would occur with the gas prior to cavern injection. Controls and valving would direct the gas into the appropriate cavern(s). If blending of the pipeline natural gas sourced gas was to be done in the cavern with gas from the second source for BTU control it would be so directed into the cavern(s) designated and operated for in-cavern blending.

Discharge from the caverns to the Pipeline(s) 436,438 would be by positive pressure differential as described in examples 1, 2, and 3 unless blending of the gas discharged from the caverns would be done at discharge instead of in the caverns. In that case, the well discharges would be controlled from the appropriate caverns so as to proportion the flow to achieve the BTU content desired in the blended stream. For example, if the desired flow to the pipelines was 600 million cubic feet per day of natural gas that could not exceed 1050 BTUs per cubic foot. If cavern 444 had gas stored in that contained 1100 BTUs per cubic foot and cavern 448 had gas stored in it that contained 1000 BTUs per cubic foot the discharge from each of the caverns could be controlled at 300 million cubic feet per day, blended in the manifold 430,428, 434 and discharged to the pipelines 436, 438 as 600 million cubic feet per day of 1050 BTU per cubic foot natural gas.

When discharging from the cavern(s) 444, 448, 452, 456, each cavern could discharge to the manifold in excess of 500 million cubic feet per day using positive pressure differential to the pipeline(s) 438,436, as described earlier. This enables the facility 400 to flow to the pipeline(s) as much as 2 billion cubic feet per day if necessary. There are no LNG liquid tank based receiving and storage facilities in the U.S. that have the capability to deliver natural gas to the pipeline system at rates as high as 2 billion cubic feet per day. This assumes that the pipeline(s) are capable of receiving gas at these high volumes. Between the wells and the pipeline(s) would be valves and controls to control pressure, volumes, and flow rates as necessary and well known to those schooled in the art of salt cavern natural gas storage.

In addition, dehydration equipment may be used to reduce or remove moisture in the gas that may be picked up in the cavern(s) also well known to those schooled in the art of salt cavern natural gas storage.

Thus, the Flexible Natural Gas Storage Facility would have the capability to receive either fluid and from storage discharge the combined fluids to the pipeline(s) at rates significantly higher than a conventional LNG liquid tank based receiving and storage terminal.

Previous FIGS. 1-11 and previous Examples 1-4 dealt with "uncompensated" salt caverns. "Uncompensated" salt caverns require use of cushion gas which can be a significant expense. As previously discussed, the cushion gas is needed in an "uncompensated" cavern to prevent salt creep, which over time, reduces the size of the salt cavern. The following FIGS. 12 and 13 and Examples 5 and 6 deal with "compensated" salt cavern storage which does not require cushion gas. In a "compensated" salt cavern, compensating liquid is pumped into the bottom of the "compensated" salt cavern to displace the hydrocarbon or other product stored in the salt cavern. When the compensating liquid is injected into the "compensated" salt cavern, the product is forced out. When product is injected into the "compensated" salt cavern, the compensating liquid is forced out. The use of the compensating liquid substantially eliminates the need for cushion gas.

Figure 12:
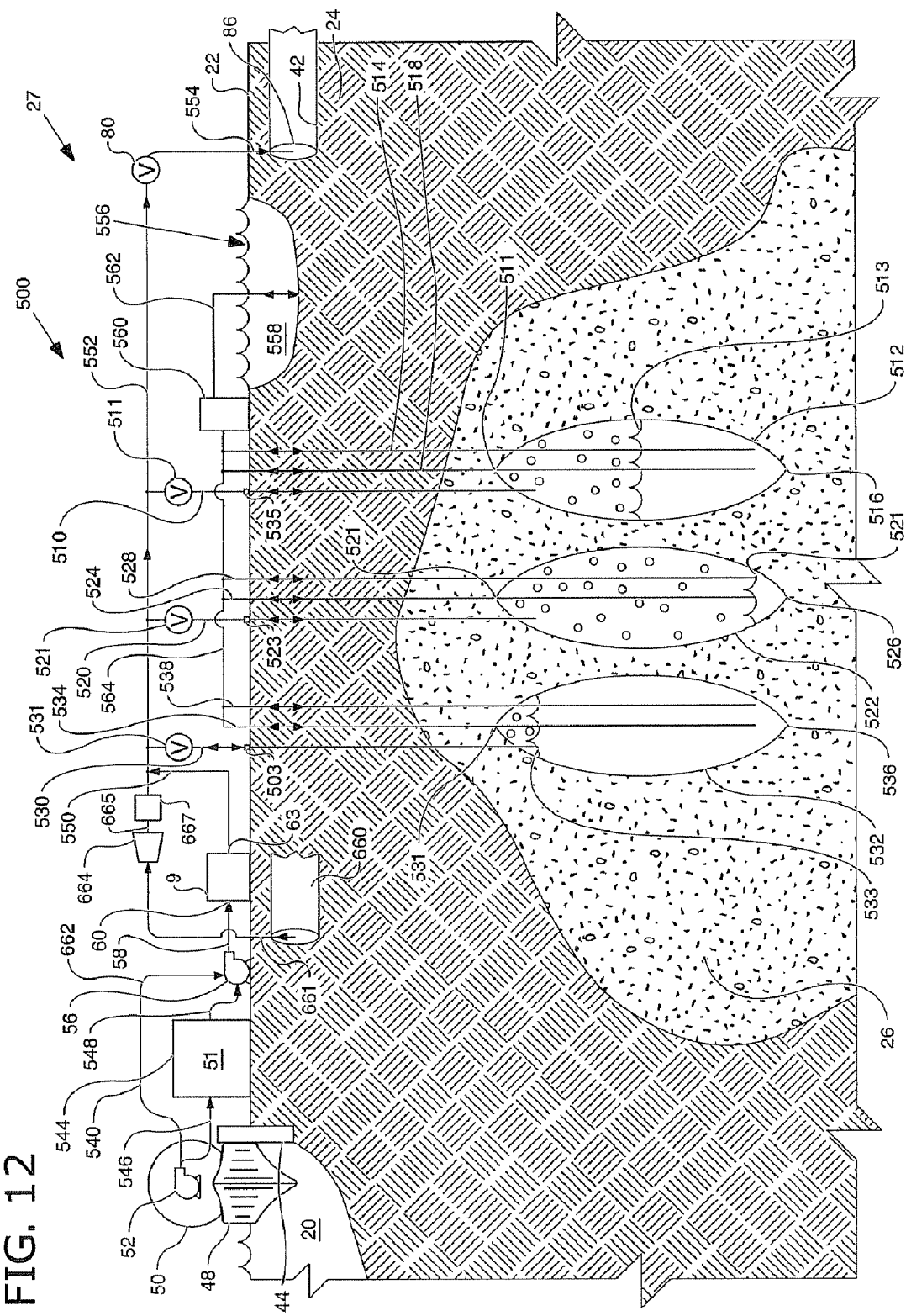
FIG. 12 is a schematic view of an on shore LNG receiving terminal that primarily uses compensated salt cavern storage.

FIG. 12 is a schematic view of an onshore LNG receiving terminal 500 that primarily uses compensated salt cavern storage. The terminal 500 in FIG. 12 avoids both the "cushion" gas expense as well as the in-the-well heat exchanger concerns with some prior art compensated salt cavern storage designs. (FIG. 12 is illustrative and is not drawn to scale.) The terminal 500 is a storage facility that is capable of receiving ship borne LNG or any other cold fluid. The term "cold fluid" as used herein means liquid natural gas (LNG), liquid petroleum gas (LPG), liquid hydrogen, liquid helium, liquid olefins, liquid propane, liquid butane, chilled compressed natural gas and other fluids that are maintained at sub-zero temperatures so they can be transported as a liquid rather than as gases.

The phrase "natural gas storage facility that is capable of receiving a ship borne cold fluid" as used herein means a facility that can offload the cold fluid from a transport ship 48 into a conventional cryogenic storage tank 544 and/or a facility that can offload the cold fluid from the transport ship 48 direct to a high pressure pumping system 56. The term "receiving a ship borne cold fluid" as used herein means offloading the cold fluid from the transport ship 48 into a conventional cryogenic storage tank 544 and/or offloading the cold fluid from the transport ship 48 direct to a high pressure pumping system 56. The phrase "natural gas storage facility that is capable of receiving ship borne LNG" as used herein means a facility that can offload the LNG from a transport ship 48 into a conventional cryogenic storage tank 544 and/or a facility that can offload the LNG from the transport ship 48 direct to a high pressure pumping system 56. The term "receiving ship borne LNG" as used herein means offloading the LNG from the transport ship 48 into a conventional cryogenic storage tank 544 and/or offloading the LNG from the transport ship 48 direct to a high pressure pumping system 56. The terminal 500 is also capable of receiving natural gas from a pipeline 660 and storing such natural gas in the compensated salt caverns 512, 522 and 532.

The entire onshore facility is generally identified by the numeral 500. Like components from prior figures will be identified by like numerals. Seawater 20 covers much, but not all, of the surface 22 of the earth 24. Various types of strata and formations are formed below the surface 22 of the earth 24. For example, a salt dome 26 is a common formation along the Gulf Coast both onshore and offshore.

A first compensated salt cavern 512 has been washed in the salt dome 26 using techniques that are well known to those skilled in the art. A gas well 510 extends from the wellhead 503 on the surface 22 through the earth 24 and into the first compensated salt cavern 512 to a level slightly below the top 511 of the cavern. At least one well 514 for a compensating liquid extends from a wellhead, not shown on the surface 22 through the earth 24 and into the first compensated salt cavern 512 to a depth near the bottom 516 of the cavern. A second well 518 for a compensating liquid may also extend from a wellhead, not shown, on the surface 22 through the earth 24 and into the first compensated salt cavern 512 to a depth near the bottom 516 of the cavern.

A second gas well 520 extends from a wellhead 523 on the surface 22, through the earth 24, the salt dome 26 and into a second compensated salt cavern 522 to a level slightly below the top 521 of the cavern. At least one well 524 for a compensating liquid extends from a wellhead, not shown, on the surface 22 through the earth 24 and into the second compensated salt cavern 522 to a depth near the bottom 526 of the cavern. A second well 528 for a compensating liquid may also extend from a wellhead, not shown, on the surface 22 through the earth 24 and into the second compensated salt cavern 522 to a depth near the bottom 526 of the cavern.

A third gas well 530 extends from a wellhead 535 on the surface 22, through the earth 24, the salt dome 26 and into a third compensated salt cavern 532 to a level slightly below the top 531 of the cavern. At least one well 534 for a compensating liquid extends from a wellhead, not shown, on the surface 22 through the earth 24 and into the third compensated salt cavern 532 to a depth near the bottom 536 of the cavern. A second well 538 for a compensating liquid may also extend from a wellhead, not shown, on the surface 22 through the earth 24 and into the third compensated salt cavern 532 to a depth near the bottom 536 of the cavern. For the sake of simplicity, the wells, 514, 518, 524, 528, 534, and 538 may henceforth be simply referred to as "brine wells" because brine is typically used as the compensating liquid after the caverns have reached their design size.

The size and capacity of the compensated caverns will vary. The drawings in FIG. 12 are illustrative, are not drawn to scale and do not necessarily reflect the true shape of the compensated salt caverns. Salt domes and salt caverns can occur completely onshore 27, completely offshore 28 or somewhere in between. A pipeline 42 has been laid under the surface 22 of the earth 24.

A dock 44 has been constructed on the bottom 46 of a harbor, not shown. A cold fluid transport ship 48 is tied up at the dock 44. The cold fluid transport ship 48 typically has a plurality of cryogenic tanks 50 that are used to store cold fluid, not shown. The cold fluid is transported in the cryogenic tanks 50 as a liquid having a sub-zero temperature. Low-pressure pump systems 52 are positioned in the cryogenic tanks 50 or on the transport ship 48 to facilitate off loading of the cold fluid.

After the cold fluid transport ship 48 has tied up to the dock 44, an offloading system, not shown, which may include hoses and flexible loading arms, is connected in fluid communication with the low-pressure pump system 52 on the transport ship 48. The outlet of the offloading system, not shown, is connected in fluid communication with the high-pressure cryogenic pump system 56 by conduits 540. The conduit 546 is in fluid communication with the offloading system, not shown and a conventional LNG storage tank 544. Conduit 548 is in fluid communication with LNG storage tank 544 and the high pressure pump system 56. Various types of cryogenic pumps are used in the LNG industry including vertical, multistaged deepwell turbines, multistage submersibles and multistaged horizontal.

When it is time to begin the offloading process, the low-pressure pump system 52 may transfer the cold fluid from the cryogenic tanks 50 on the transport ship 48 through hoses, flexible loading arms and articulated piping, not shown, and additional conduit 540 direct to the high pressure pumping system 56, and thereafter through conduit 58 to the inlet 60 of a heat exchanger 9 used in the present invention. The low-pressure pump system 52 may also transfer the cold fluid 51 from the cryogenic tanks 50 on the transport ship 48 through hoses, flexible loading arms and articulated piping, not shown, and additional conduit 546 to a conventional LNG storage tank 544. Thereafter, the cold fluid 51 passes from the LNG storage tank 544 through the conduit 548 to the high pressure pumping system 56. Heat exchanger 9 will warm the cold fluid 51 to approximately +40° F., depending on downstream requirements. A Bishop Process heat exchanger 62 or 220, previously discussed in connection with FIGS. 2-8, may be used as the heat exchanger 9. The Bishop Process heat exchangers 62 and 220 operate with cold fluid in the dense phase. When heat exchangers 62 and/or 220 have been selected, the cold fluid 51 leaves the high pressure cryogenic pumping system 56 as dense phase fluid 64 because of the pressure imparted by the pump. When LNG is the cold fluid and heat exchangers 62 and/or 220 are in use, the high pressure pumping system converts the cold fluid to dense phase natural gas ("DPNG"). The term dense phase is discussed in greater detail concerning FIG. 9, above.

A conventional vaporizer system 260, previously discussed in connection with FIG. 10, may also be used as the heat exchanger 9. The vaporizer system 260 can operate in the dense phase or it can operate below dense phase pressures.

Conventional vaporizer systems 260, typically do not operate in the dense phase and are designed to function with stratification. Unlike heat exchangers 62 and 220 it is not necessary in this alternative embodiment of the terminal 500 to have the fluid in the dense phase while it passes through the conventional vaporizer 260, nor are high Froude numbers required. When the cold fluid 51 leaves a conventional vaporizer system 260 it may sometimes be simply referred to as a "warmed gas". The phrase "warmed fluid" as used herein includes both a) "warmed gas" and b) warmed dense phase natural gas (DPNG).

The terminal will therefore function with a variety of different heat exchangers including but not limited to an integral heated (fired) vaporizer, a remote heated (fired) vaporizer, an ambient vaporizer, a process heated vaporizer, a submerged combustion vaporizer or some combination of several different types of heat exchangers. For example, a submerged combustion vaporizer may be used in the colder months and an ambient vaporizer used in the warmer months. The terminal 500 can function in the dense phase, which is preferred, using heat exchangers 62, 220 and/or 260; or the terminal 500 can operate below dense phase conditions using any conventional vaporizer system.

The heat exchanger 9 may need sea water, fresh water or some other liquid as a warmant. The pumps and conduits for a warmant have not been show in FIG. 12, but systems similar to those shown in the FIGS. 2-8 may also be suitable in this application.

The following description of FIG. 12 assumes that the terminal 500 is designed with a heat exchanger such as 62, 220 and/or 260 that operates in the dense phase. A flexible joint, not shown, or an expansion joint is connected to the outlet 63 of the heat exchanger 9 to accommodate expansion and contraction of the cryogenically compatible piping 61, better seen in FIG. 2, inside the heat exchanger 9 (high nickel steel may be suitable for the piping 61.) A number of factors must be considered when designing the terminal 500 including the type of cold fluid, the type of compensating liquid, and the type of warmant, if any, that will be used. Conventional instrumentation for process measurement, control and safety are included in the facility as needed including but not limited to: temperature and pressure sensors, flow measurement sensors, overpressure reliefs, regulators and valves, which are not shown, but are known to those skilled in the art. Various input parameters must also be considered including, pipe geometry and length, flow rates, temperatures and specific heat for both the cold fluid and the warmant. Various output parameters must also be considered including the type, size, temperature and pressure of the compensated salt caverns. For delivery directly to a pipeline, other output parameters must also be considered such as pipe geometry, pressure, length, flow rate and temperature. Other important design considerations include the size of the cold fluid transport ship and the time interval during which the ship must be fully offloaded and sent back to sea.

Conduit 550 is in fluid communication with a header conduit 552. The gas wells 510, 520 and 530 are in fluid communication with the header conduit 552. The outlet 554 of the header conduit 552 is in fluid communication with the pipeline 42 which connects with the pipeline grid for delivery of the gas to market. The dense phase fluid 64 leaves the heat exchanger 9 through the outlet 63 and passes through the conduit 550 into the header conduit 552. This dense phase fluid 64 may then flow into the gas wells 530, 520 and 510 and thereafter into the compensated salt caverns 532, 522 and 512.

In addition, the dense phase fluid 64 can be transferred from the heat exchanger 9 through conduit 550 and header conduit 552 to a throttling valve 80 or regulator which connects via additional subsurface or surface piping to the inlet 86 of the pipeline 42. The dense phase fluid 64 is then transported via the pipeline 42 to market. (The pipeline 42 may also be on the surface.)

A pond 556 is filled with brine 558, or another compensating liquid. A pumping system 560 for the compensating liquid is in fluid communication with the pond 556 through conduit 562. The pumping system 560 for the compensating liquid is also in fluid communication with a header conduit 564 which connects to all the brine wells, 514, 518, 524, 528, 534 and 538. This allows the brine 558, or another compensating liquid, to be pumped from the pond 556 into the compensated caverns 512, 522 and 532 in order to force the product out of the caverns to the pipeline 42. When dense phase fluid 64 is pumped into the caverns 512, 522 and 538 it forces the compensating liquid 558 out of the salt caverns into the pond 556. Therefore the brine wells 514, 518, 524, 528, 534 and 538 transport brine or other compensating liquid into and out of the compensated salt caverns; as indicated by the bidirectional flow arrows in the drawing. Likewise the gas wells 510, 520 and 530 are bidirectional as indicated by the flow arrows in the drawing. The caverns 512, 522 and 532 are referred to as "compensated" caverns because of the compensating liquid that is required for operation. In contrast, "uncompensated" salt caverns do not require a compensating liquid for proper operation.

The term "interface level" as used herein, is a common industry term that refers to the level where the compensating liquid comes into contact with the stored product. The level of the brine or other compensating liquid typically varies from a "low" interface to a "high" interface. The brine in compensated salt cavern 532 is at the "high" interface level 533 which is at the end of gas well 531. The brine in compensated salt cavern 522 is at the "low" interface level 521 which is near the end of the brine wells 524 and 528. The brine in compensation salt cavern 512 is at an "intermediate" interface level 513 which is about half way in between the "low" and "high" interface levels.

Gas from the pipeline 660 may also be stored in the compensated caverns, 512, 522 and 532. The pipeline is connected by conduit 661 to a compressor 664 where the natural gas is compressed to salt cavern pressure. The compression process also raises the temperature of the natural gas by about 200° F. The compressor 664 is connected via piping 665 to a conventional heat exchanger 667. The natural gas flows from the compressor 664 to the heat exchanger 667 where it is cooled to temperatures compatible with the salt cavern as previously explained. It is preferable, though not required, to raise the pressure of the gas from the pipeline source to dense phase levels for storage in a salt cavern. However, on some days during high drawdown, the cavern pressure may fall below dense phase levels. Various valves and other control mechanisms, not shown, allow operators to control the flow of fluids in the terminal 500.

EXAMPLE #5

This hypothetical example is merely designed to give broad operational parameters for this alternative embodiment. This example assumes standard pipeline gas having a molecular weight of about 17.4 and a Btu content of about 1050. "Full compensation" allows the brine to maintain a stable operating pressure range for the warmed fluid in the cavern and is a low cost operating mode. (Hereinafter sometimes referred to as the "Operational Pressure Range" for the full compensation operational mode") The Operational Pressure Range for the full compensation operational mode will typically extend over several hundred psi and will vary from salt cavern to salt cavern depending on the depth of the cavern and cavern geometry. In this example, the Operational Pressure Range for the Full Compensation operational mode is from about 1040 psi to about 1190 psi. The top of the salt cavern is about 1690 feet below the surface and top interface level is about 1700 feet below the surface. The bottom interface level is about 2000 feet below the surface and the bottom of the cavern is about 2010 feet below the surface. Thus, the total internal height of this salt cavern is about 320 feet.

The wells 510, 520 and 530 are slick holes (i.e. no hanging string), and are dedicated to injection and withdrawal of warmed fluid. One or more additional wells 514, 518, 524, 528, 534 and 538 are dedicated to brine injection and withdrawal. The number of these wells would depend on the desired fill and withdrawal rates for the warmed fluid. All of the aforementioned wells (510, 520, 530, 514, 518, 524, 528 and 534) have master safety valves, not shown, in the wellhead cellar. In some jurisdictions, i.e. Europe, the wells would be required to have subsurface safety valves which can be accommodated using the present invention.

Filling the first compensated salt cavern 512 takes place by injecting warmed fluid through the gas well 510 and at the same time recovering displaced brine from the brine wells 514 and 518. The displaced brine is stored for reuse in the brine pond 556 or other types of brine storage, not shown, such as the porous salt dome cap rock or any other porous geological formation. The minimum pressure for the warmed fluid is that necessary to lift the brine to the surface and to overcome the friction losses at the designed gas fill rate. Brine velocity will be determined by the number of brine wells available and the gas fill rate. Brine velocities are limited by erosion and vibration considerations. Stored brine usually has few particles in it and erosion should not be a factor in limiting flow velocity. The U.S. Strategic Petroleum Reserve uses compensated caverns and allows a maximum brine velocity of 30 fps. Little research has been done on maximum velocities for the warmed fluid in wells. Velocities as high as 200 fps may be acceptable.

When the operators wish to withdraw warmed fluid from the salt caverns and send it to market, brine is pumped from the storage pond 556, or other type of storage, into the salt caverns. In the salt cavern storage business, this is called "drawdown" and one or more control valves 511, 521, and 531 are opened and warmed fluid is withdrawn at the desired rate. If the volumetric flow rate of the brine matches the volumetric rate of the warmed fluid, both on fill and drawdown, (at cavern conditions, not Standard Conditions), then the process is "fully compensated". Standard Conditions refer to the conditions at which warmed fluid is measured for trade, typically 14.7 psi and 60° F. Cavern Storage Conditions are typically higher in pressure and temperature than Standard Conditions.

The full compensation mode of operation usually represents a low cost operation. When the warmed fluid in a compensated cavern is kept in the Operational Pressure Range, that pressure is sufficient to reach the destination pipeline. The pressure on the warmed fluid, exerted by the brine column in the brine wells must be enough to force the warmed fluid from the cavern at the desired velocity and to overcome all of the pressure drops on the surface, thus reaching the pipeline at the required pipeline pressure. Brine injection is then at a rate equal to the in-cavern warmed fluid volume removal, thus maintaining the cavern in the Operational Pressure Range for operation in the full compensation mode.

For example if a pipeline requires gas in storage at 1190 psi, then one can choose a cavern depth that allows brine to be expelled from the cavern at this pressure. This depth turns out to be 2000 feet, assuming saturated brine at 100° F., a 10 inch ID pipe and a maximum velocity of 20 fps. If the internal cavern height is taken at about 320 feet, then one can calculate the gas pressure required at the high interface and of course, calculate the brine injection pressures required to maintain 1190 psi during drawdown. The results of these calculations are shown in Table 1.

Drawdown of a "fully compensated" cavern requires that the volume of brine injection keeps pace with the actual volume of warmed fluid produced, thus keeping the warmed fluid in the Operational Pressure Range (from about 1040 psi to about 1190 psi). In the present example, brine injection pressure starts out at 275 psi for the low interface and goes to 430 psi at the high interface each producing a flow rate of 4900 GPM. An equal volume amount of warmed fluid is produced, which at standard conditions equates to a rate of 86 million SCF per day. The warmed fluid is assumed to be at 100° F. Higher rates can be obtained in direct proportion to the brine injected by adding additional brine flow capability. Table 1 below summarizes these conditions for a 0.6 gravity gas.

TABLE 1

Warmed Fluid and Brine Flow Rates for Filling the Compensated Salt Cavern with Warmed Fluid

| | Warmed Fluid Injection Rate | | Brine Press. wellhead | Brine Production Rate | | |
|---|---|---|---|---|---|---|
| | ft³/sec | SCF/D | psig | fps | GPM | ft³/sec |
| Pressure Warmed Fluid psig | | | | | | |
| High 1040 Interface Level | 10.92 | 81 × 10⁶ | 30 | 20 | 4900 | 10.92 |
| Low 1190 Interface Level Brine Injection to Expel Warmed Fluid | 10.92 | 86 × 10⁶ | 30 | 20 | 4900 | 0.92 |
| Low 1190 Interface Level | 10.92 | 86 × 10⁶ | 275 | 20 | 4900 | 10.92 |
| High 1190 Interface Level | 10.92 | | 430 | 20 | 4900 | 10.92 |

EXAMPLE #6

This hypothetical example is merely designed to give broad operational parameters for this alternative embodiment. This example assumes standard pipeline gas having a molecular weight of about 17.4 and a Btu content of about 1050. This is an example of a salt cavern operated in the "Partial Compensation" mode. During the fill process, the warmed fluid pressure is about 1765 psi until the gas reaches the low interface level; thereafter, further gas fill raises the warmed fluid pressure to about 2173 psi. During drawdown, the warmed fluid leaves the salt cavern and the pressure falls from about 2173 to about 1765 without the need for brine injection; thereafter, brine injection keeps the warmed fluid pressure at about 1765 psi. Both the "Partial Compensation" mode and the "Full Compensation" mode eliminate the cushion gas requirement of conventional uncompensated salt cavern storage. However, operation of a salt cavern storage facility in a "Partial Compensation" mode allows each cavern to hold more warmed fluid than does operation in the "Full Compensation" mode of Example 5, above. This increase in storage capacity is directly proportional to the pressure increase above the Operational Pressure Range discussed in Example 5. This increased storage capacity comes at a price. The energy costs for operation in the "Partial Compensation" mode are higher than operation in the "Full Compensation" mode because of the higher operating pressures.

In Example 6, the warmed fluid pressure ranges from about 2173 psi to about 1765 psi while operating in the "Partial Compensation" mode. The top of this salt cavern is about 3600 feet below the surface and the top interface level is about 3610 feet below the surface. The low interface level is about 3970 feet below the surface and the bottom of the cavern is about 3980 below the surface. Thus the total internal height of the salt cavern, below ground, is about 380 feet.

Compensated storage caverns provide piping flow paths for both the product and for the displacing liquid. At the U.S. Strategic Petroleum Reserve this is done in a variety of different ways for their crude oil storage. One arrangement is a cavern with three wells, where two brine wells are used to reduce the pressure drop in these long strings, and a third product well has a short hanging string.

For this example, it is proposed that an existing cavern be provided with three wells except that the warmed fluid well 510 will not require a hanging string since the roof can only come in contact with gas or saturated brine. An existing well 514 will be relined with a 10¾ inch last cemented casing which extends to the proposed lowest interface at 3970 ft. Well 518 is a new brine well with a 13⅜ inch last cemented casing, also extending to 3970 ft, and well 510 is the new gas well, a 13⅜ inch slick hole drilled to the high point of the cavern at very approximately 3610 ft.

Well 510 is slick hole and can be protected with a master shut-off valve at the surface, not shown. Wells 514 and 518 have protective strings suspended from hangers in the wellhead. Since the annuli formed by strings have no outlets (they are not operating pathways) they can also be protected by the wellhead master valve. This is not possible when working hanging strings are installed. This example is for an onshore facility.

For an offshore facility, all wells would be fitted with subsurface safety valves ("SSV's"), not shown. For the slick hole well 510 for the warmed fluid this presents no problem as such valves can be built. For the wells with the protective hanging strings, these strings must be suspended from hanger packers just below the required SSV depth. The SSV is then installed above the hanger packer and fitted into a polished bore receiver.

Thus the wells are protected from wellhead failure. The proposed vertical spacing between the bottom of the brine wells 514 and 518 and the gas well 510 allows for maximum use of the cavern volume, but the cavern can be operated over any vertical span within this range, depending on storage needs. A warmed fluid operating pressure of about 2173 psi has been selected for operation of the cavern in the "Partial Compensation" mode. This pressure allows the brine to be forced from the cavern at the desired maximum flow velocities and to arrive at the surface at 30 psi to go to the brine pond 558 or to pump suction. The operational scenario assumes a lowest interface at 3970 ft. between the brine and the warmed fluid and a highest interface at 3610 ft. as discussed above. For both fill and drawdown, a maximum allowable brine flow velocity of approximately 20 fps has been assumed. This is well within the Strategic Petroleum Reserve velocity guideline of 30 fps maximum. Table 2 shows warmed fluid fill operating conditions for brine and gas flows for wells 514, 518 and 510.

TABLE 2

Brine and Warmed Fluid Flows while filling the
Salt Cavern with Warmed Fluid at 2173 psi

|  | GPM | Velocity fps | Gas In-Flow (Well 3-BCFD) |
|---|---|---|---|
| Well 1 Interface Level ft | | | |
| Hi 3610 | 5090 | 20.8 | 0.1701 |
| Inter. 3790 | 4110 | 16.8 | 0.1374 |
| Low 3970 | 2740 | 11.2 | 0.0916 |
| Well 2 | | | |
| High 3610 | 8770 | 23.4 | 0.2930 |
| Inter. 3790 | 7120 | 19.0 | 0.2379 |
| Low 3970 | 4800 | 12.8 | 0.1603 |
| Totals, 2 Wells | | | |
| High 3610 | 13860 | | 0.4631 |
| Inter. 3790 | 11230 | | 0.3753 |
| Low 3970 | 7540 | | 0.2519 |

Average fill rate over full cavern interval = 365 million SCFD

The fill process described above takes place at a more or less constant pressure determined by the cavern depth (height of the column of brine above the interface) and by the desired fill rate which produces flow friction losses.

Drawdown will normally take place by using pumps to inject brine from the brine pond 556 or other storage into wells 514 and 518, forcing the warmed fluid out of well 510 at some pressure. This pressure need not be the same as the injection pressure used above. In order to minimize the pump horsepower required and to match the surface pressure requirement, the initial cavern drawdown is by expansion until the cavern reaches a pressure of 1765 psi. This pressure is chosen so that at the most favorable condition for drawdown, i.e. at the low interface position at 3970 ft, the horsepower required for brine well 518, the larger well, is essentially zero.

Initially, the warmed fluid leaves the salt cavern because it is under pressure. Generally the initial depressuring will amount to about 20% of the total warmed fluid stored in the cavern. No additional brine is initially pumped into the salt cavern. However, once the cavern reaches about 1765 psi, the pumps for the compensating liquid are activated and the horsepower is increased from the low interface level on up, with the intent of making the flow velocity constant at 25 fps. If it is decided not to operate the cavern at this maximum interface depth, the required pump horsepower will be lowered proportionately. This assumes that 1200 psi is acceptable at the surface.

Table 3 shows the drawdown operating conditions for the cavern wells, recalling that brine inflow does not start until pressure drops to 1765 psi. If it is assumed that the usable cavern space between the defined intervals is 14 MMB and the cavern has been filled to this maximum at 2173 psi, the amount of warmed fluid that will be taken out during this initial depressuring is 2.8 BCF.

TABLE 3

Brine Flows During Drawdown with the warmed fluid at 1765 psi

|  | Velocity fps | Surface P psig | GPM (gas) | BSCFD | Hp |
|---|---|---|---|---|---|
| Well 1 Interface Level | | | | | |
| High 1100 m | 25 | 270 | 6125 | 0.1621 | 1205 |
| Inter. 1155 m | " | 189 | " | " | 845 |
| Low 1210 m | " | 95 | " | " | 425 |
| Averages | " | 185 | " | " | 825 |
| Well 2 | | | | | |
| High 1100 | 25 | 189 | 9400 | 0.2488 | 1295 |
| Inter. 1155 | " | 95 | " | " | 650 |
| Low 1210 | " | 1 | " | " | 5 |
| Averages | " | 95 | " | " | 650 |
| Totals, 2 Wells | | | 15,525 | 0.4109 | 1475 |

Ultimately the cavern will be substantially filled with brine and substantially all the warmed fluid will be expelled. Because the salt cavern is full of brine, there is no cushion gas. Brine inflow during such a period would need to be stopped or slowed when the brine velocities approached their limits. After such a drawdown, the cavern would be refilled with gas and normal operations would be continued.

Figure 13:
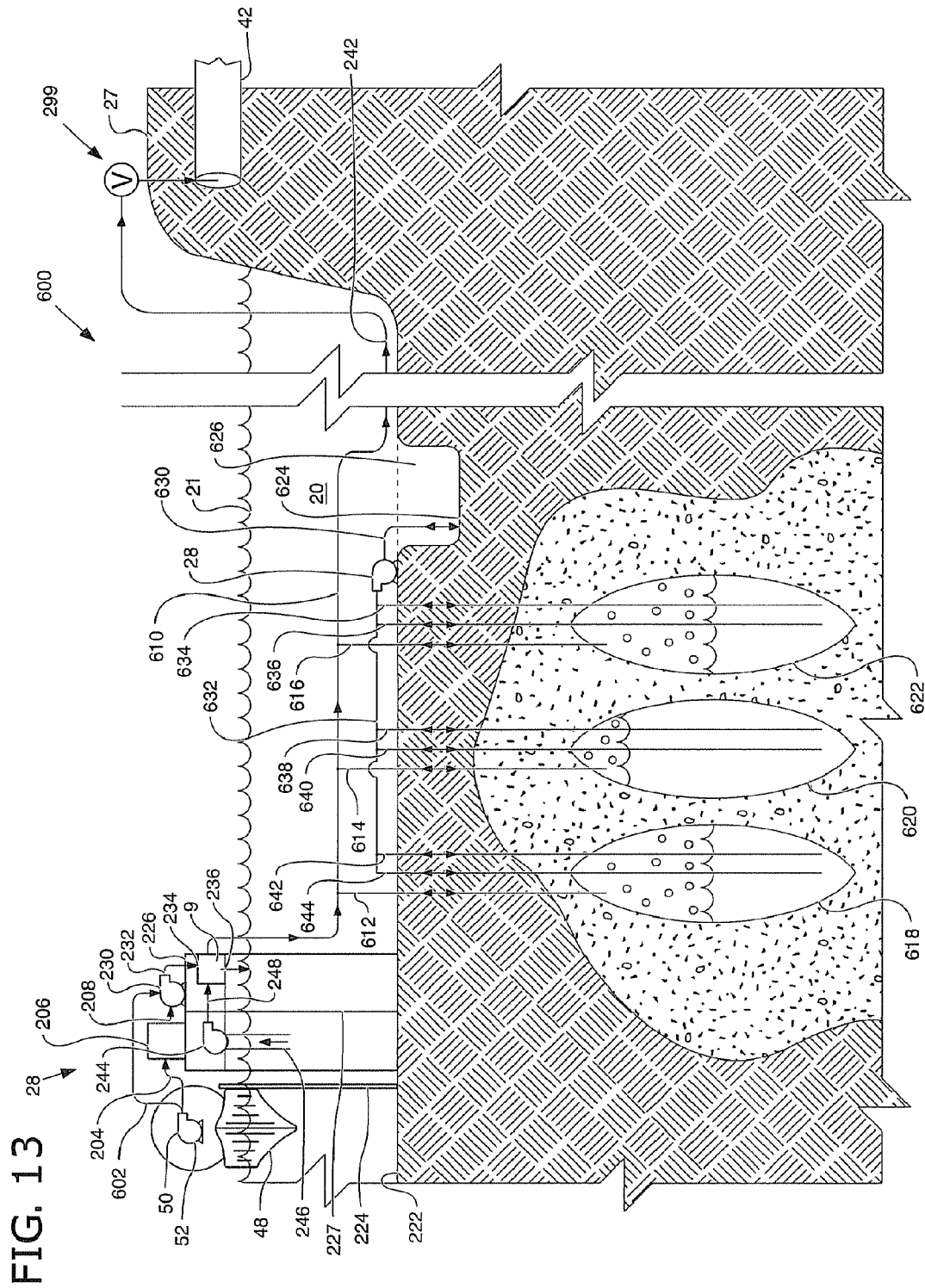
FIG. 13 is a schematic view of an offshore LNG receiving terminal that primarily uses compensated salt cavern storage.

FIG. 13 is a schematic view of an offshore LNG receiving terminal that primarily uses compensated salt cavern storage. This figure is not drawn to scale and is for illustrative purposes only. The facility 600 is located offshore 28 and the facility 299 is located onshore 27. The offshore facility 600 may be many miles from land and is connected to the onshore facility 299 by a subsea pipeline 242.

Heat exchanger 9 will warm the cold fluid to approximately +40° F. depending on downstream requirements. A Bishop Process heat exchanger 62 or 220, previously discussed in connection with FIGS. 2-8 may be used as the heat exchanger 9. A vaporizer system, 260, previously discussed in connection with FIG. 10, may also be used as the heat exchanger 9. The facility 600 preferably operates in dense phase conditions using heat exchanger 62, 220 and/or 260. In an alternative embodiment, the facility 600 may operate below the dense phase with a conventional heat exchanger as previously discussed.

The heat exchanger 9 may need sea water as a warmant which is discussed below. The heat exchanger 9 could be mounted on the platform 226 above the surface 21 of the water 20 as shown in FIG. 13. The mooring/docking device 224 is secured to the sea floor 222 and allows cold fluid transport ships 48 to be tied up offshore 28. Likewise a platform 226 has legs 227, which are secured to the sea floor 222, and provides a stable facility for equipment and operations described below.

A number of factors must be considered when designing the facility 600 including the type of cold fluid and warmant that will be used. Conventional instrumentation for process measurement, control and safety are included in the facility as needed including but not limited to: temperature and pressure sensors, flow measurement sensors, overpressure reliefs, regulators and valves, which are not shown, but are known to those skilled in the art. Various input parameters must also be considered including, pipe geometry and length, flow rates, temperatures and specific heat for both the cold fluid and the warmant. Various output parameters must also be considered including the type, size, temperature and pressure of the compensated salt caverns. For delivery directly to a pipeline, other output parameters must also be considered such as pipe geometry, pressure, length, flow rate and temperature. Other important design considerations include the size of the cold fluid transport ship and the time interval during which the ship must be fully offloaded and sent back to sea.

After the cold fluid transport ship 48 has been successfully secured to the mooring/docking device 228, articulated piping, hoses and flexible loading arms, not shown, are connected to the low-pressure pump system 52 located in the cryogenic tanks 50 or on board the transport ship 48. A conduit 602 connects the offloading system, not shown, to a high-pressure pumping system 230 located on the platform 226. The following discussion concerning facility 600 assumes that the facility and equipment are operating in the dense phase. The high pressure pumping system 230 raises the pressure of the cold fluid to the dense phase. When LNG is the cold fluid, the high pressure pumping system 230 raises the pressure of the LNG to convert the LNG into dense phase natural gas ("DPNG") 64 and moves the DPNG through the heat exchanger 9. Additional cryogenically compatible piping 232 connects the high-pressure pumping system 230 to the inlet 234 of the heat exchanger 9.

The offloading system, not shown, may also be connected by a conduit 204 to a cold fluid storage tank 206. Another conduit 208 is in fluid communication with the cold fluid storage tank 206 and the high pressure pumping system 52.

The offshore heat exchanger 9 may use seawater 20 as a warmant 99. The warmant, if needed, enters piping 246 on the platform 226 and passes through the low-pressure warmant pump 244. The warmant pump 244 may also be submersible. Piping 248 connects the low-pressure warmant pump 244 to the heat exchanger 9. After the warmant has gone through the heat exchanger, it is discharged back into the ocean as indicated by the arrow in the drawing.

After the cold fluid 51 passes through the high-pressure pump system 230 it then passes through the heat exchanger 9. The subsea pipeline 242 is formed from non-cryogenically compatible piping.

Each compensated salt cavern has a bidirectional gas well. Each gas well has a wellhead, not shown, as is well know to those skilled in the art. These wellheads, not shown, may be on the ocean floor or above the surface depending on water depths and other design factors well know to those skilled in the art. Compensated salt cavern 618 is in fluid communication with gas well 612. Compensated salt cavern 620 is in fluid communication with gas well 614. Compensated salt cavern 622 is in fluid communication with gas well 616. The three gas wells 612, 614 and 616 are in fluid communication with a header conduit 610 which is in fluid communication with the heat exchanger 220. Although the header conduit 610 is shown in this figure on or near the sea floor, it may also be located above the water's surface, depending on water depths and other design factors, well know to those skilled in the art. The header conduit 610 allows dense phase fluid to exit the heat exchanger and flow through the header conduit, the wellheads, not shown and the gas wells into each salt cavern. Because the gas wells are bidirectional, gas also flows out of the compensated salt caverns into the header conduit to the subsea pipeline 242 and thereafter to the pipeline 42. The pipeline 42 connects to the pipeline grid and allows the gas to be transported to market.

Offshore salt caverns are typically leached using sea water because it is readily available, rather than fresh water. Once the salt cavern has reached its design size, brine is typically used as the compensating liquid. However, during early stage operations, the compensating liquid would typically be sea water, until the salt cavern reached its design size. For the sake of simplicity, "brine" will henceforth be used in this explanation.

A subsea brine pond 624 is filled with brine 626. Because seawater is less dense than brine, the brine stays in the subsea brine pond. A pumping system 628 is in fluid communication with the brine pond 624 through brine pond conduit 630. The brine pumping system 628 is also in fluid communication with a brine header conduit 632 which connects to all the brine wells 634, 636, 638, 640, 642 and 644. This allows the brine 626 to be pumped from the brine pond 624 into the compensated caverns 618, 620 and 622 in order to force the gas out of the caverns to the pipeline 42. When gas is pumped into the compensated salt caverns 618, 620 and 622 it forces the brine 626 out into the brine pond 224. Therefore the brine wells 634, 636, 638, 640, 642 and 644 transport brine into and out of the compensated salt caverns, as indicated by the flow arrows in the drawing. These brine wells accommodate bidirectional flow. Likewise the gas wells 510, 520 and 530 are bi-directional as indicated by the arrows in the drawing. The caverns 618, 620 and 622 are referred to as "compensated" caverns because of the use of brine as a compensating fluid. Various valves and other control mechanisms, not shown, allow operators to control the flow of fluids in the facility 600 and 299.

What is claimed is:

1. A natural gas storage facility that is capable of receiving a ship borne cold fluid, the facility comprising:
   at least one compensated salt cavern;
   means for moving a compensating liquid into and out of the at least one compensated salt cavern;
   at least one heat exchanger to warm the cold fluid, the at least one heat exchanger positioned on the surface and outside of the at least one compensated salt cavern, the at least one heat exchanger performing the majority of the warming of the cold fluid before the cold fluid enters the salt cavern; and
   at least one cryogenic pumping system to pump the cold fluid through the at least one heat exchanger, to raise the temperature of the cold fluid to a temperature that is compatible with the at least one compensated salt cavern and to cause the cold fluid to become a warmed fluid, before at least a potion of the warmed fluid is placed in the at least one compensated salt cavern for storage.

2. The natural gas storage facility of claim 1 further including:
   at least one compressor to compress natural gas from at least one pipeline source; and at least one heat exchanger to cool the compressed natural gas to a temperature that is compatible with the compensated salt cavern, before the compressed natural gas is placed in the at least one compensated salt cavern for storage.

3. The natural gas storage facility of claim 2 further including:
   a second compensated salt cavern to store the compressed natural gas;
   means for moving a compensating liquid into and out of the second compensated salt cavern;
   a third compensated salt cavern to store and blend a portion of the warmed fluid from the first compensated salt cavern with a portion of the compressed natural gas from the second compensated salt cavern to adjust the Btu content of the blended fluids to conform to a pre-established pipeline standard; and
   means for moving the compensating liquid into and out of the third compensated salt cavern.

4. A method of storing natural gas comprising:
receiving ship borne cold fluid;
positioning a heat exchanger on the surface and outside at least one compensated salt cavern;
pumping the cold fluid through the at least one heat exchanger;
heating the cold fluid in the at least one heat exchanger to a temperature that is compatible with the at least one compensated salt cavern and causing the cold fluid to become a warmed fluid, the at least one heat exchanger performing the majority of the warming of the cold fluid before the cold fluid enters the salt cavern;
transferring at least a portion of the warmed fluid into the at least one compensated salt cavern; and
pumping a compensating liquid into the at least one compensated salt cavern.

5. The method of claim 4 further including:
compressing natural gas from a pipeline;
cooling the compressed natural gas to a temperature that is compatible with the at least one compensated salt cavern; and
storing the cooled, compressed natural gas in the at least one compensated salt cavern.

6. The method of claim 5 further including:
blending at least a portion of the warmed fluid from a first compensated salt cavern with at least a portion of the cooled, compressed natural gas from a second compensated salt cavern to adjust the Btu content of the blended fluids to conform to a pre-established pipeline standard.

7. A natural gas storage facility that is capable of receiving ship borne LNG, the facility comprising:
at least one compensated salt cavern;
means for moving a compensating liquid into and out of the at least one compensated salt cavern;
at least one heat exchanger positioned on the surface and outside of the at least one compensated salt cavern, the at least one heat exchanger performing the majority of the warming of the cold fluid before the cold fluid enters the salt cavern; and
at least one cryogenic pumping system to raise the pressure of the LNG to convert the LNG into dense phase natural gas (DPNG) and move the DPNG through the at least one heat exchanger, to raise the temperature of the DPNG to a temperature that is compatible with the at least one compensated salt cavern, before at least a portion of the warmed DPNG is placed in the at least one compensated salt cavern for storage.

8. The natural gas storage facility of claim 7 further including:
at least one compressor to compress natural gas from at least one, pipeline source; and at least one heat exchanger to cool the compressed natural gas to a temperature that is compatible with the compensated salt cavern, before the compressed natural gas is placed in the at least one compensated salt cavern for storage.

9. The natural gas storage facility of claim 8 further including:
a second compensated salt cavern to store the compressed natural gas;
means for moving a compensating liquid into and out of the second compensated salt cavern;
a third compensated salt cavern to store and blend a portion of the DPNG from the first compensated salt cavern with a portion of the compressed natural gas from the second compensated salt cavern to adjust the Btu content of the blended fluids to conform to a pre-established pipeline standard; and
means for moving the compensating liquid into and out of the third compensated salt cavern.

10. The natural gas storage facility of claim 7 wherein the heat exchanger has a pipe in pipe design with at least one inner conduit formed from cryogenically compatible material and a outer conduit is formed from material that is not cryogenically compatible, the inner conduit being of sufficient strength to contain the pressures of the DPNG.

11. The natural gas storage facility of claim 7 wherein the heat exchanger is a vaporizer that is of sufficient strength to contain the pressures of the DPNG.

12. A method of storing natural gas comprising:
receiving ship borne LNG;
positioning a heat exchanger on the surface and outside at least one compensated salt cavern, the at least one heat exchanger performing the majority of the warming of the cold fluid before the cold fluid enters the salt cavern;
pumping and pressurizing the LNG so it becomes a dense phase natural gas (DPNG) and moves through the at least one heat exchanger;
heating the DPNG in the at least one heat exchanger to a temperature that is compatible with the at least one compensated salt cavern;
transferring at least a portion of the warmed DPNG into the at least one compensated salt cavern; and
pumping a compensating liquid into the at least one compensated salt cavern.

13. The method of claim 12 further including:
compressing natural gas from a pipeline;
cooling the compressed natural gas to a temperature that is compatible with the at least one compensated salt cavern; and
storing the cooled, compressed natural gas in the at least one compensated salt cavern.

14. The method of claim 13 further including: maintaining the pressure of the DPNG in the at least one compensated salt cavern in the operating pressure range for the full compensation mode.

15. The method of claim 13 further including:
raising the pressure of the DPNG in the at least one compensated salt cavern to allow operation in the partial compensation mode.

16. The method of claim 14 further including:
blending at least a portion of the DPNG from a first compensated salt cavern with at least a portion of the cooled, compressed natural gas from a second compensated salt cavern to adjust the Btu content of the blended fluids to conform to a pre-established pipeline standard.

17. A natural gas storage facility that is capable of receiving ship borne LNG, the facility comprising:
at least one compensated salt cavern;
means for moving a compensating liquid into and out of the at least one compensated salt cavern;
at least one conventional vaporizer positioned on the surface and outside of the at least one compensated salt cavern, the at least one conventional vaporizer performing the majority of the warming of the cold fluid before the cold fluid enters the salt cavern; and
at least one cryogenic pumping system to pump the LNG through the at least one conventional vaporizer, to raise the temperature of the LNG to a temperature that is compatible with the at least one compensated salt cavern and to cause the LNG to become a warmed gas, before at least a potion of the warmed gas is placed in the at least one compensated salt cavern for storage.

18. The flexible natural gas storage facility of claim 17 further including:

at least one compressor to compress natural gas from at least one pipeline source; and at least one heat exchanger to cool the compressed natural gas to a temperature that is compatible with the compensated salt cavern, before the compressed natural gas is placed in the at least one compensated salt cavern for storage.

19. The natural gas storage facility of claim 18 further including:

a second compensated salt cavern to store the compressed natural gas;

means for moving a compensating liquid into and out of the second compensated salt cavern;

a third compensated salt cavern to store and blend a portion of the warmed gas from the first compensated salt cavern with a portion of the compressed natural gas from the second compensated salt cavern to adjust the Btu content of the blended fluids to conform to a pre-established pipeline standard; and means for moving the compensating liquid into and out of the third compensated salt cavern.

20. A method of storing natural gas comprising:

receiving ship borne LNG;

positioning a conventional vaporizer on the surface and outside at least one compensated salt cavern;

pumping the LNG through the at least one conventional vaporizer;

heating the LNG in the at least one conventional vaporizer to a temperature that is compatible with the at least one compensated salt cavern and causing the LNG to become a warmed gas, the at least one conventional vaporizer performing the majority of the warming of the cold fluid before the cold fluid enters the salt cavern;

transferring at least a portion of the warmed gas into the at least one compensated salt cavern; and pumping a compensating liquid into the at least one compensated salt cavern.

21. The method of claim 20 further including:

compressing natural gas from a pipeline;

cooling the compressed natural gas to a temperature that is compatible with the at least one compensated salt cavern; and storing the cooled, compressed natural gas in the at least one compensated salt cavern.

22. The method of claim 21 further including:

blending at least a portion of the warmed gas from a first compensated salt cavern with at least a portion of the cooled, compressed natural gas from a second compensated salt cavern to adjust the Btu content of the blended fluids to conform to a pre-established pipeline standard.

* * * * *